(12) United States Patent
Stefik et al.

(10) Patent No.: US 8,816,879 B2
(45) Date of Patent: Aug. 26, 2014

(54) COMPUTER-IMPLEMENTED SYSTEM AND METHOD FOR MANAGING INTERCHANGEABLE PARKING SPACES

(71) Applicant: Palo Alto Research Center Incorporated, Palo Alto, CA (US)

(72) Inventors: Mark J Stefik, Portola Valley, CA (US); Kristian Lyngbaek, Palo Alto, CA (US); Christopher R. Dance, Granoble (FR); Shrenik Devasani, Redwood City, CA (US); Craig Eldershaw, Belmont, CA (US); Roger Hoover, San Bruno, CA (US); Ellen Isaacs, San Jose, CA (US); Peter Jarvis, Sunnyvale, CA (US); Sylvia Smullin, Menlo Park, CA (US); Makiko Taniguchi, San Francisco, CA (US); Francisco E Torres, San Jose, CA (US); Alan G Bell, Los Altos, CA (US); Robert Thomas Krivacic, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 29 days.

(21) Appl. No.: 13/624,876

(22) Filed: Sep. 21, 2012

(65) Prior Publication Data

US 2014/0085109 A1 Mar. 27, 2014

(51) Int. Cl.
*B60Q 1/00* (2006.01)
*G08G 1/14* (2006.01)
*G07B 15/00* (2011.01)

(52) U.S. Cl.
USPC .................................... 340/932.2; 340/425.5

(58) Field of Classification Search
CPC ... G08G 1/14; G08G 1/017; G08G 1/096838; G08G 1/147; G07B 15/02; G06Q 10/02; G06Q 30/0284

USPC ............ 340/901, 932.2, 933, 425.5; 235/375, 235/384; 701/426; 705/5, 13
See application file for complete search history.

(56) References Cited

U.S. PATENT DOCUMENTS

| 4,137,662 | A | 2/1979 | Baumer |
| 4,310,890 | A | 1/1982 | Trehn et al. |

(Continued)

FOREIGN PATENT DOCUMENTS

| WO | 2004084145 | 9/2004 |
| WO | 2011002583 | 1/2011 |

OTHER PUBLICATIONS

Weinberger et al., US Parking Policies: An Overview of Management Strategies, Institute for Transportation & Development Policy, http://www.streetsblog.org/wp-content/pdf/ITDP_Parking_FullReport.pdf, Feb. 2010, retrieved Jun. 7, 2013.

(Continued)

*Primary Examiner* — Van T. Trieu
(74) *Attorney, Agent, or Firm* — Patrick J. S. Inouye; Makiko Coffland

(57) ABSTRACT

A computer-implemented system and method for managing interchangeable parking spaces is provided. A parking pool that includes a plurality of parking spaces, which are each interchangeably reservable by motorists, is formed. The parking spaces in the parking pool that are currently-occupied by other vehicles and any reservations by motorists to park their vehicles in the parking pool are identified. The number of the parking spaces in the parking pool free of the currently-occupied parking spaces and the parking spaces in the parking pool that will be used to fulfill the reservations, plus the time available for parking in the parking pool, are displayed.

20 Claims, 13 Drawing Sheets

(56) References Cited

U.S. PATENT DOCUMENTS

| | | | |
|---|---|---|---|
| 4,356,903 A | 11/1982 | Lemelson et al. | |
| 4,532,418 A | 7/1985 | Meese et al. | |
| 5,266,947 A | 11/1993 | Fujiwara et al. | |
| 5,432,508 A | 7/1995 | Jackson | |
| 5,570,771 A | 11/1996 | Jacobs | |
| 5,710,557 A | 1/1998 | Schuette | |
| 5,710,743 A | 1/1998 | Dee et al. | |
| 5,740,050 A | 4/1998 | Ward, II | |
| 5,770,845 A | 6/1998 | Hjelmvik | |
| 5,777,951 A | 7/1998 | Mitschele | |
| 5,841,369 A | 11/1998 | Sutton et al. | |
| 5,910,782 A | 6/1999 | Schmitt et al. | |
| 6,078,272 A | 6/2000 | Jacobs et al. | |
| 6,081,205 A | 6/2000 | Williams | |
| 6,081,206 A | 6/2000 | Kielland | |
| 6,102,285 A | 8/2000 | Elias | |
| 6,111,522 A | 8/2000 | Hiltz et al. | |
| 6,188,328 B1 | 2/2001 | Ho | |
| 6,243,028 B1 | 6/2001 | Krygler et al. | |
| 6,243,029 B1 | 6/2001 | Tomer | |
| 6,275,169 B1 | 8/2001 | Krygler et al. | |
| 6,373,401 B2 | 4/2002 | Ho | |
| 6,411,895 B1 | 6/2002 | Lau et al. | |
| 6,437,692 B1 | 8/2002 | Petite et al. | |
| 6,459,386 B1 | 10/2002 | Jones | |
| 6,493,676 B1 | 12/2002 | Levy | |
| 6,505,774 B1 | 1/2003 | Fulcher et al. | |
| 6,513,711 B1 | 2/2003 | Hjelmvik | |
| 6,519,329 B1 | 2/2003 | Hjelmvik | |
| 6,577,248 B1 | 6/2003 | Hjelmvik | |
| 6,791,473 B2 | 9/2004 | Kimbria et al. | |
| RE38,626 E | 10/2004 | Kielland | |
| 6,812,857 B1 | 11/2004 | Kassab et al. | |
| 6,816,085 B1 | 11/2004 | Haynes et al. | |
| 6,823,317 B1 | 11/2004 | Quimet et al. | |
| 6,885,311 B2 | 4/2005 | Howard et al. | |
| 6,889,899 B2 * | 5/2005 | Silberberg | 235/384 |
| 6,927,700 B1 | 8/2005 | Quinn | |
| 6,929,179 B2 | 8/2005 | Fulcher et al. | |
| 6,946,974 B1 | 9/2005 | Racunas, Jr. | |
| 7,002,487 B1 | 2/2006 | Montgomery, Sr. | |
| 7,014,355 B2 | 3/2006 | Potter, Sr. et al. | |
| 7,019,670 B2 | 3/2006 | Bahar | |
| 7,123,166 B1 | 10/2006 | Haynes et al. | |
| 7,237,716 B2 | 7/2007 | Silberberg | |
| 7,277,010 B2 | 10/2007 | Joao | |
| RE40,013 E | 1/2008 | Quinn | |
| 7,321,317 B2 | 1/2008 | Nath et al. | |
| 7,382,244 B1 | 6/2008 | Donovan et al. | |
| 7,393,134 B2 | 7/2008 | Mitschele | |
| 7,474,589 B2 | 1/2009 | Showen et al. | |
| 7,579,964 B2 | 8/2009 | Nath et al. | |
| 7,652,593 B1 | 1/2010 | Haynes et al. | |
| 7,667,619 B2 | 2/2010 | Montgomery, Sr. | |
| 7,688,225 B1 | 3/2010 | Haynes et al. | |
| 7,768,426 B2 | 8/2010 | Groft | |
| 7,791,501 B2 | 9/2010 | Ioli | |
| 7,791,503 B2 | 9/2010 | Breed et al. | |
| 7,805,239 B2 | 9/2010 | Kaplan et al. | |
| 7,840,427 B2 | 11/2010 | O'Sullivan | |
| 7,855,935 B1 | 12/2010 | Lauder et al. | |
| 7,900,966 B1 | 3/2011 | Stennett | |
| 7,949,464 B2 * | 5/2011 | Kaplan et al. | 701/426 |
| 7,956,769 B1 | 6/2011 | Pearl | |
| 8,600,786 B2 * | 12/2013 | Stefik et al. | 705/5 |
| 2002/0077953 A1 | 6/2002 | Dutta | |
| 2002/0099574 A1 | 7/2002 | Cahill et al. | |
| 2003/0055727 A1 | 3/2003 | Walker et al. | |
| 2004/0068433 A1 | 4/2004 | Chatterjee et al. | |
| 2004/0236615 A1 | 11/2004 | Msndy | |
| 2004/0254840 A1 | 12/2004 | Slemmer et al. | |
| 2005/0280555 A1 * | 12/2005 | Warner, IV | 340/932.2 |
| 2006/0068704 A1 | 3/2006 | Bhakta et al. | |
| 2006/0247848 A1 | 11/2006 | Cheng | |
| 2006/0259353 A1 | 11/2006 | Gutmann | |
| 2007/0008181 A1 | 1/2007 | Rollert et al. | |
| 2007/0050240 A1 * | 3/2007 | Belani et al. | 705/13 |
| 2007/0136128 A1 | 6/2007 | Janacek et al. | |
| 2007/0290888 A1 | 12/2007 | Reif et al. | |
| 2008/0133425 A1 | 6/2008 | Grush | |
| 2008/0136674 A1 | 6/2008 | Jang et al. | |
| 2008/0208680 A1 | 8/2008 | Cho | |
| 2009/0125341 A1 | 5/2009 | Somoza et al. | |
| 2009/0164635 A1 | 6/2009 | Denker et al. | |
| 2009/0276236 A1 | 11/2009 | Adamczyk et al. | |
| 2009/0309760 A1 | 12/2009 | Chew | |
| 2010/0106514 A1 | 4/2010 | Cox | |
| 2010/0328104 A1 | 12/2010 | Groft | |
| 2011/0035261 A1 | 2/2011 | Handler | |
| 2011/0068739 A1 * | 3/2011 | Smith | 320/109 |
| 2011/0127944 A1 | 6/2011 | Saito et al. | |
| 2011/0131083 A1 | 6/2011 | Redmann et al. | |
| 2011/0140658 A1 | 6/2011 | Outwater et al. | |
| 2011/0193522 A1 | 8/2011 | Uesugi | |
| 2011/0227533 A1 | 9/2011 | Wolfien | |
| 2011/0241619 A1 | 10/2011 | Young et al. | |
| 2011/0246252 A1 | 10/2011 | Uesugi | |
| 2011/0257881 A1 | 10/2011 | Chen et al. | |
| 2012/0053998 A1 | 3/2012 | Redmann | |
| 2012/0112698 A1 | 5/2012 | Yoshimura et al. | |
| 2012/0173292 A1 | 7/2012 | Solomon et al. | |
| 2012/0188101 A1 | 7/2012 | Ganot | |
| 2013/0073350 A1 * | 3/2013 | Blustein | 705/13 |

OTHER PUBLICATIONS

Geroliminis et al., "A review of green logistics schemes used in cities around the world", UC Berkeley Center of Future Urban transport: A volvo center of excellence, http://escholarship.org/uc/item/4x89p485.pdf, Aug. 1, 2005, retrieved Jun. 19, 2013.

Smith et al., "Intelligent Transportation Systems and Truck Parking," Feb. 2005.

\* cited by examiner

COMPUTER-IMPLEMENTED SYSTEM AND METHOD FOR MANAGING INTERCHANGEABLE PARKING SPACES

FIELD

This application relates in general to motor vehicle parking control and management and, in particular, to a computer-implemented system and method for managing interchangeable parking spaces.

BACKGROUND

Public roads primarily facilitate traffic. Parking is offered as a secondary benefit incident to vehicle throughway. Local governments typically regulate parking on public roads, whether at curbside, in municipal lots, or on other public property, through a regulatory scheme that promotes public safety and provides revenue generation. The impact of regulated control over on-street parking affects all motorists, as well as urban residents, local businesses, commercial drivers, and other parties that use or rely upon on-street parking. Drivers who need to park their vehicle are directly impacted by regulated parking control. For example, looking for a parking space wastes time and fuel, contributes to traffic congestion, creates frustration and stress, and increases pollution, while disregarding parking regulations can result in parking tickets, fines, or towing. Still, despite these downsides, parking regulation remains a practical necessity.

Commonly, public parking is controlled through parking restrictions and prohibitions that permit parking on a first-come, first-served basis, with few exceptions, such as allowed by special permit. Parking compliance is regulated through a scheme of fees assessed for fixed intervals of time, after which a motorist is expected to either leave or, if permitted, pay for additional time. Public parking is typically purchased using parking meters assigned to individual parking spaces or through nearby curbside pay stations that collect payment and print a receipt, which must be displayed on the vehicle as proof of payment ("pay and display"); collect payment and provide the parking space number or identifier ("pay and no display"); collect payment and provide a license plate number; as well as other methods of associating proof of payment with use of a parking space, including where payment is transacted by phone or online.

Deploying parking meters at every parking space impacts the appearance and aesthetics of a street and increases maintenance and operating expenses to the local government. Where offered, public parking reservation systems forego physical parking meters and provide motorists with a centrally-operated alternative to the uncertainty of first-come, first-served on-the-street metered public parking. These types of systems allow drivers to plan ahead and reduce their stress over finding parking where and when needed. By enabling motorists to adjust their schedules to account for parking availability, drivers can plan direct and timely routes to available parking and save on time, fuel and headaches. As well, the public benefits from increased predictability and reduced traffic congestion.

Existing parking reservations systems retain the paradigm of traditional metered parking by treating parking spaces as individually-reservable resources, which can create a further set of problems. When reservations are associated with individual parking spaces, each unoccupied space has its own unique list of pending reservations. Time gaps between adjoining reservations may be too short to be usable by other motorists, thereby reducing overall parking occupancy. Moreover, when each individually-reserved parking space has a potentially different amount of time available, drivers without a parking reservation are forced to keep searching until they find an open parking space with enough unreserved time for parking. Conventional parking systems reflect this paradigm.

U.S. Pat. No. RE40,013, reissued Jan. 22, 2008, to Quinn, discloses a method and apparatus for detection and remote notification of vehicle parking space. Local detector devices sense the presence or absence of a vehicle in an individual parking space and communicate individual parking space identification and status information to a computer network. The information is integrated with electronic street maps. The street maps, annotated with the parking space status identifiers, are electronically communicated to any number of networks.

U.S. Pat. No. 7,791,501, issued Sep. 7, 2010, to Ioli, discloses a vehicle identification, tracking, and parking enforcement system. The system includes a meter system that generates image data of a vehicle in an individual parking space, public roadway, and highway entrances and exits. In operation, the system allows license tags, special parking permits, handicapped tags, or other suitable tags to be readily identified, which allows parking areas that have been reserved for handicapped or other personnel to be monitored. Unauthorized individuals that have parked in those locations can thereby be determined. An enforcement and tracking system receives the vehicle image data and generates a vehicle license number, vehicle tag identification number, and facial image. From the image date acquired, monitoring of parking spaces is performed and violation citations or notices are generated.

U.S. Pat. No. 7,768,426, issued Aug. 3, 2010, to Groft, discloses a parking system employing remote asset management techniques. A vehicle detection system and smart meter identify all information as to an individual parking space, including when a vehicle enters or leaves, how long the vehicle has been in the space, whether the parking meter associated with that space is in good operating order, whether the requested charge for parking has been paid, whether the vehicle is in compliance with regulations, whether a violation has occurred or is about to occur, and the status of usage of the collection mechanism. This information is collected, stored, and transmitted to a central command and control interface, which collates, analyses, and transmits reports to a display. All parties involved in parking, from whatever point of view, are able to monitor the status of all parking spaces in near real time and make use of the information developed on an interactive basis, thereby enabling the highest degree of efficiency in management of parking spaces through real time parking information collection.

U.S. Pat. No. 7,579,964, issued Aug. 25, 2009, to Nath et al., discloses a method for intelligent parking, pollution, and surveillance control. Parking meters sense the presence of a vehicle parked in a metered zone by emitting a narrow signal beam around an area where a vehicle can park. Two pairs of miniature surveillance cameras are included in the housing of an intelligent parking enforcement device, such as a parking meter. The presence of a vehicle parked nearby is sensed by a sensor beacon and, on the successful acknowledgement of a vehicle's presence, the system transmits a unique identifier to the parked vehicle and continuously monitors the vehicle for idling. The intelligent parking enforcement device communicates with a automobile registration control system, which is informed of impending parking violations and, when appropriate, a violation summons is issued.

U.S. Pat. No. 7,393,134, issued Jul. 1, 2008, to Mitschele, discloses a parking meter that includes a micro-controller coupled with a vehicle detector that is focused at an associated parking space. A payment acceptance mechanism is coupled with the micro-controller to receive payment for pre-paid parking. Operation of the parking meter is initiated by directing an interrogation signal at an associated parking space and the presence of a vehicle is detected. A parking violation occurs when the driver either fails to make payment within a pre-determined standby interval or when the pre-paid parking interval expires.

U.S. Pat. No. 7,237,716, issued Jul. 3, 2007, to Silberberg, discloses a parking system for sending messages. The parking system has a parking meter in close proximity to an individual parking space. The parking meter receives payment and thereafter establishes a parking period, during which a vehicle is able to legitimately park in the space. A communication means sends a message to the user's mobile phone prior to the expiry of the parking period.

U.S. Pat. No. 7,019,670, issued Mar. 28, 2006, to Bahar, discloses an enhanced meter utilizing user identification technology. A user or vehicle is identified by communication of user data into the parking meter system. If the meter expires with the vehicle remaining in the parking space, a citation is electronically processed and delivered. A vehicle presence detector utilizes infrared, ultrasonic, sonar, photoelectric, or other technology to detect the presence of a vehicle in a metered parking space. Recognition of the user or vehicle further enables the system to limit the individual's or vehicle's parking time to help regulate traffic within a municipality district, as well as prevent people from parking on a metered location for excessive periods of time.

U.S. Pat. No. 7,014,355, issued Mar. 21, 2006, to Potter, Sr. et al., discloses an electronic parking meter system. Electronically-operated parking meters are coupled with a sensor for positively and unobtrusively sensing the presence or absence of a vehicle in an individual parking space. An induction coil mounted below the surface of a parking area provides positive signals to the parking meter upon both the entrance and movement of a vehicle into and from the parking space. A transaction record can be stored showing exact dates and times of the arrival and departure of the vehicle. This data, when combined with other records, can provide a variety of real time management information to a parking manager, including an electronic citation issuance system.

U.S. Pat. No. 6,823,317, issued Nov. 23, 2004, to Ouimet et al., discloses an urban parking system. A wireless network covering a large local geographic area is linked to a large number of payment terminals, which are located near a plurality of parking spaces, either at curbside or in municipal lots. Parking data is gathered from motorists at the payment terminals, including vehicle or parking space identification data. The parking data is sent to the wireless network in response to payment. A plurality of portable terminals is provided for use by parking wardens. The wireless network is used to transmit the parking data to the portable terminals of the parking wardens upon receipt.

U.S. Pat. No. 6,493,676, issued Dec. 10, 2002, to Levy, discloses a system and method for charging for vehicle parking. A parking system includes a plurality of mobile parking units that each has a unique identification for installation in a vehicle, and a parking control center for communicating with each of the mobile parking units. Each mobile parking unit checks its location whenever the vehicle is not moving and, if the location coincides with a known parking area, a charge for parking is activated until the vehicle resumes travel.

U.S. Pat. No. 5,910,782, issued Jun. 8, 1999, to Schmitt et al., discloses an on-board vehicle parking space finder service. When a vehicle enters a parking space, a parking meter, equipped with an ultrasonic, sonar, or other sensor device, senses the presence of the vehicle and changes its internal state to "occupied." When the vehicle leaves, the parking meter senses the departure and changes its internal space to "available." As soon as the parking meter detects a change of state, a data message containing the parking meter identifier or location information and parking availability status is sent to a nearby central site. When a driver desires to locate available on-street parking, a request is sent from the on-board navigation computer to the central site. Upon receipt, the central site computer transmits a parking space availability message to the vehicle. The vehicle on-board computer displays the parking space availability to the requester.

There is a need for more efficiently offering public parking to motorists that avoids the inefficiencies of individually-metered or -reserved parking allocation and control approaches.

SUMMARY

A centralized server-based system and method for managing and reserving parking spaces treats sets of parking spaces, such as the parking spaces on one side of a city block, as a parking pool, and a motorist reserves parking by identifying a parking pool or, alternatively, a location nearby the parking pool. The constituent parking spaces within a parking pool are interchangeable for the purposes of making reservations and parking.

One embodiment provides a computer-implemented system and method for managing interchangeable parking spaces. A parking pool that includes a plurality of parking spaces, which are each interchangeably reservable by motorists, is formed. The parking spaces in the parking pool that are currently-occupied by other vehicles and any reservations by motorists to park their vehicles in the parking pool are identified. The number of the parking spaces in the parking pool free of the currently-occupied parking spaces and the parking spaces in the parking pool that will be used to fulfill the reservations, plus the time available for parking in the parking pool, are displayed.

The foregoing system and method provides several advantages over conventional approaches to parking management. First, by aggregating reservations across interchangeable parking spaces, short time gaps in parking space usage can be consolidated, which reduces fragmentation and can raise the overall level of parking space occupancy. Additionally, unoccupied parking spaces at any time are interchangeable and have the same available time, thereby eliminating the benefit of "cruising" for parking. Moreover, making parking spaces interchangeable makes the reservations system easier to use. Drivers need not specify a particular parking space when they are making reservations and they can pull into any available parking space within the parking pool when parking. Finally, interchangeable parking reservations require less equipment, as one parking meter per parking space is no longer necessary.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Parking Services Infrastructure

Figure 1:
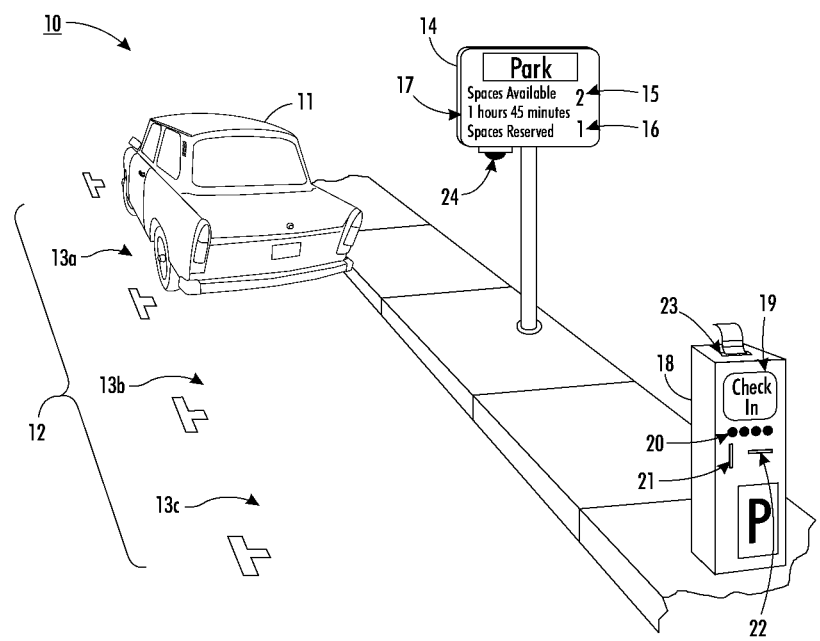
FIG. 1 is a diagram showing a computer-implemented system for managing interchangeable parking spaces in accordance with one embodiment.

Motorists, urban residents, local businesses, commercial drivers, and other parties that use or rely upon on-street parking are able to reserve and use public parking through centrally-managed groups of interchangeably reservable parking spaces. FIG. 1 is a diagram showing a computer-implemented system 10 for managing interchangeable parking spaces 13a-c in accordance with one embodiment. Individual parking spaces 13a-c are formed into a parking pool 12. The parking spaces 13a-c are managed as a common pool, whether the individual parking spaces 13a-c are physically adjacent to each other or disbursed.

A motorist can reserve space for parking a vehicle 11 in a parking pool 12 ahead of time or on-site as a form of "instant" parking reservation. The same considerations apply if a motorist already parked in one of the parking spaces 13a-c within a parking pool 12 wants to extend the parking time. In a further embodiment, the parking spaces 13a-c are capable of charging plug-in hybrid and electric vehicles ("EVs") and can be designated for dual use, which includes charging and parking usage by an EV or parking-only usage by any vehicle, such as described in commonly-assigned U.S. patent application, entitled, "Computer-Implemented System And Method For Managing Interchangeable EV Charging-Capable Parking Spaces," Ser. No. 13/624,883, filed Sep. 21, 2012, pending, the disclosure of which is incorporated by reference. For simplicity, parking, whether controlled by local government or privately owned, and regardless of whether curbside, on a driveway, in cutouts in front of a driveway ("curbcuts"), within a parking lot, or in other physical locations will henceforth be called "on-street parking" or simply "parking."

Parking within a pool 12 of interchangeably reservable parking spaces 13a-c can be requested ahead of time by a motorist through centralized parking services or on-site using a parking meter or appliance or, in a further embodiment, a virtual overlay communications device, such as a GPS device, a smart phone, a regular phone with an automated menu, augmented reality glasses, an audio player, or other similar devices, as further described infra. The system can be configured to allow only parking reserved in advance, or to also accommodate on-the-spot parking. When offered, conventional first-come, first-served on-street parking may be subject to applicable parking restrictions and prohibitions and local restrictions. First-come, first-served on-street parking is also limited by any pending parking reservations for the parking spaces 13a-c in the parking pool 12 affected where the on-street parking is desired. Additionally, the applicable parking restrictions and prohibitions, local restrictions and price may automatically change, based on fixed rules by time of day, or could be revised dynamically based on parking demand or on some other metric.

Parking support equipment, as variously configured and further described infra, provide the functions needed to reserve and manage parking in parking pools 12 of interchangeable parking spaces 13a-c. For instance, dynamically-updated signage 14 located adjacent or near to the parking pool 12 can advise motorists of on-street parking availability 15 and duration 17, plus whether any current pending reservations 16 may affect the unoccupied parking spaces 13b-13c in the parking pool 12. The parking advisory displayed by the signage 18 could apply locally to just those parking spaces 13a-c to which the signage is near, to one city block face, to an entire city block, or any other area of parking interest. Ideally, the signage 18 displays the parking advisory large enough to allow motorists to read the information necessary to making a decision on parking without getting out of their vehicles. In a further embodiment, the dynamic signage 14 provides multiple choices of parking availability times and, in a still further embodiment, is accompanied by a unstable state indicator, which warns motorists that parking availability is unstable and about to change, as further described infra with reference to FIG. 8. A vehicle occupancy sensor 24, such as a video or still camera, collectively measures occupancy of all of the parking spaces 13a-c. In a further embodiment, the parking services 33 can notify parking enforcement authorities when a motorist has parked in a parking space 13a-c without a reservation, payment or other form of authorization, such as a disabled parking permit. In a still further embodiment, the parking services can physically block or permit access to the parking spaces 13a-c by deploying motorized posts (bollards) (not shown) that rise or drop below street level under system control, thereby serving the dual purposes of physically blocking reserved parking spaces and visually reinforcing that parking is not presently permitted.

Motorists can interact with the centralized parking services that handle the parking spaces 13a-c assigned to the parking pool 12 through a parking meter 18, as well as a parking appliance or virtual overlay communications device, which includes the motorist contacting the parking services and the parking services contacting the motorist, either personally or through a broadcast message, as permitted by the motorist. The parking meter 18 includes a display 19 that shows the maximum amount of time for parking in the parking pool 12 or, in a further embodiment, preferentially-ordered parking availability, as further described infra with reference to FIG. 7, and plurality of controls 20 to provide a user interface, as well as facilities for receiving a credit or debit card or similar electronic media 21 or currency 22, and a printer 23 to provide a receipt or proof of parking authorization. In addition, when a motorist has a virtual overlay communications device and provides contact information, the parking service 33 could initiate communication with a motorist to provide an update on a waitlisted parking reservation request or other type of authorized parking status. Still other devices with which to interact with the parking services are possible.

Components

Parking management and reservation services ("parking services") are adaptable to operating on different configurations of parking support equipment, including configurations for managing multiple parking spaces (multi-metered parking), single parking spaces (single-metered parking), multiple parking spaces through a short tether arrangement (short-tethered parking), and mixed uses, such as concurrent loading zone and short-term parking, as further described infra respectively with reference to FIGS. 3-6. In a further embodiment, parking services are provided without requiring deployed parking support equipment through a virtual overlay parking reservations system, as also further described infra. Other configurations are possible.

Each configuration of parking support equipment provides the following functions:

1) Indicating whether on-street parking is available (permitted) for parking and for how long.
2) Indicating whether there are current pending reservations for any unoccupied parking spaces.
3) Sensing and logging the occupancy state of parking spaces.
4) Supporting user interactions with the parking services.

Other functions, including functions needed to provide legacy support for traditional individually-reservable parking, as well as showing current and future price for parking, are possible.

Figure 2:
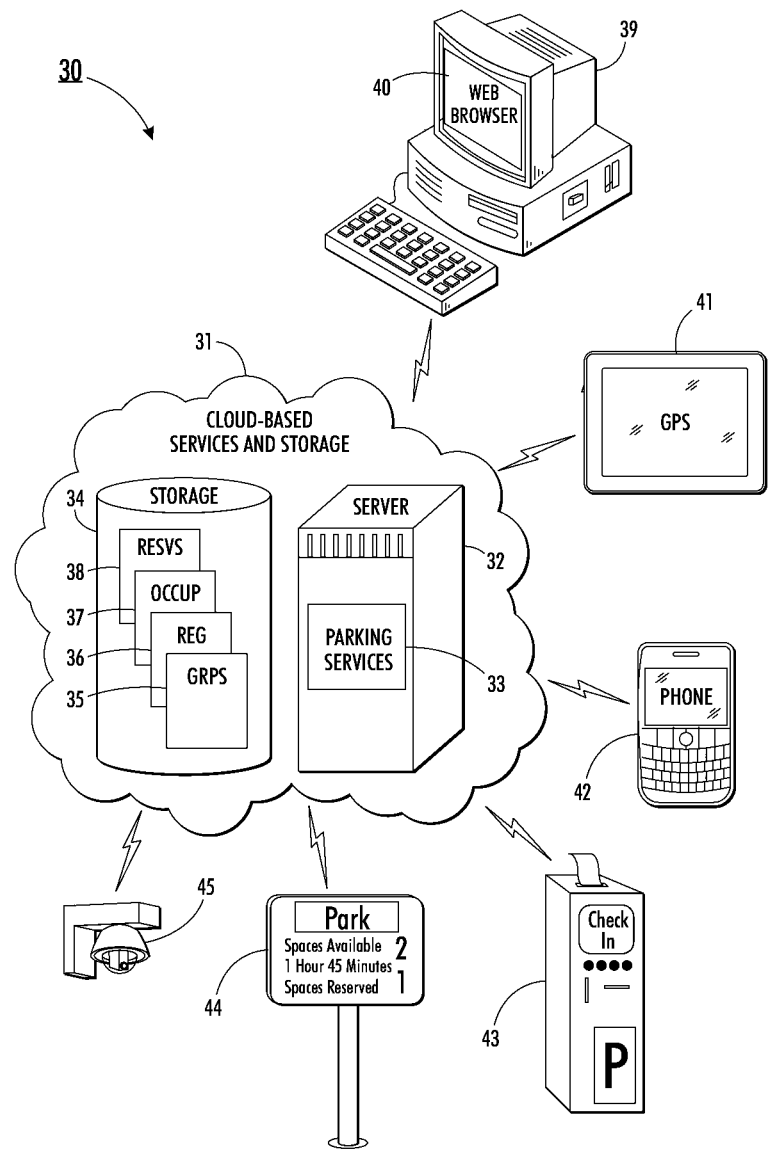
FIG. 2 is a functional block diagram showing the components of the system of FIG. 1.

The parking services are provided through a centrally-managed hub from which a range of different types of components provide vehicle occupancy inputs and user outputs for creating parking reservations and displaying parking status. FIG. 2 is a functional block diagram showing the components 30 of the system 10 of FIG. 1. The parking services 33 rely upon identifying which motorists or vehicles are arriving, occupying and departing, which enables the parking services 33 to account for charges properly upon vehicle departure. In one embodiment, parking reservations are assigned by location and a motorist checks-in to a parking pool 12 of parking spaces 13a-c ("pay-by-pool" or "pay-by-location") and vehicle occupancy sensors identify when the vehicle 11 leaves from the parking space 13a-c within the parking pool 12. In a further embodiment, a motorist checks-in to a particular parking space 13a-c ("pay-by-space") when parking and vehicle occupancy sensors identify when the vehicle 11 leaves the parking space 13a-c.

The parking services are provided through centrally-operated parking servers 32 that can be remotely accessed by users over a wide area public data communications network, such as the Internet, using wired or wireless connections. The parking services 33 are server-based and implemented on the parking servers 32, which may be provided through cloud-based services 31 or by dedicated servers (not shown). Similarly, storage of parking data may also be provided through cloud-based storage 34 or by dedicated storage (not shown). The parking servers 32 communicate with governmental transportation department officials or their equivalent for setting parking policies, enforcing parking regulations, prohibitions and, if applicable, local restrictions and monitoring system performance. In addition, the parking servers 32 can communicate with private and commercial drivers, city residents, merchants, parking enforcement officers, and other stakeholders for the various types of parking services provided.

These users can communicate with and provide payment to the parking services 33 through various types of devices, depending upon the location of the user, the context of the communications and, if applicable, form of payment. To request parking reservations or interact with parking services 33, users can access the parking servers 32 through, for instance, a personal or tablet computer 39 using a Web browser or similar application 40, a GPS device 41 with a parking application, a parking application on a wireless mobile device 42, such as a smart phone or similar wireless-capable and Web-enabled device, and a parking meter or appliance 43 located at curbside or near to the parking spaces 13a-c, for instance, on a sidewalk. Payment in currency can be collected at curbside by the parking meter or appliance 43 and payment, including preauthorizations for parking, using an electronic form of payment, such as a credit or debit card, can be collected at curbside or remotely by the parking services 33. Other types of fixed or mobile user communication devices are possible.

The parking spaces 13a-c in each parking pool 12 are interchangeable. The parking servers 32 maintain lists or databases of parking data, which may be changed by the parking services 33 as needed. The parking data includes a list or database of the interchangeable parking spaces each of the parking pools ("Grps") 35; a set of parking time regulations ("Regs") 36 that typically apply to all of the parking spaces in each parking pool; parking space occupancy data ("Occup") 37 indicating which parking spaces are currently occupied by a vehicle; and a set of parking reservations ("Resys") 38 for parking at future times. Other data may also be stored for use by parking services 33, including a waitlist of parking reservation requests that have not yet been fulfilled or requests to extend the time on an existing parking reservation and contact information for drivers to notify them of reservation status, waitlist status, changing fee structures, or other relevant information, as appropriate to the type of parking reservation desired.

The status of parking within a parking pool 12 is provided through dynamic signage 44 that is also located at curbside or nearby. The dynamic signage 44 can be a single sign or separate signs associated with individual parking spaces 13a-c, such as provided on a parking meter or appliance. However, in contrast to signs indicating parking space occupancy for individually-reservable parking spaces, the dynamic signage 44 reflects parking status for the parking pool 12, and each separate sign shows the same parking pool-centric status, except in a mixed use configuration, as further described infra. Other types of dynamic signage are possible.

The parking services 33 tracks the occupancy state of parking spaces 13a-c, both individually and as part of a parking pool 12, through vehicle occupancy sensors 45, such as video or still cameras, magnetic sensors, or ultrasonic sensors, located at curbside or nearby. Each sensor 45 determines whether one or more parking spaces 13a-c is currently occupied by a vehicle 11 or is available for parking. One sensor 45 can be assigned to each parking space 13a-c or a single sensor 45 can be deployed to monitor several parking spaces 13a-c, such as the parking spaces 13a-c within a parking pool 12. Other types of sensors are possible.

Parking Support Equipment Configurations

In use, parking services installations can combine different configurations of parking support equipment for different areas in a city or urban area. For example, some city blocks may be configured with a multi-space parking appliance on each city block face, while other city blocks may include simple single-space parking appliances for managing curbcut parking or loading zones. Other city blocks may use a combination of multi- and single-space parking appliances. As well, some city blocks may have dynamic signage or multi-space parking appliances. Any block may be served by mobile applications. Different types of sensors for measuring vehicle occupancy could be used throughout. Different configurations of parking support equipment will now be discussed.

Multi-Space Parking Meter Configuration

Figure 3:
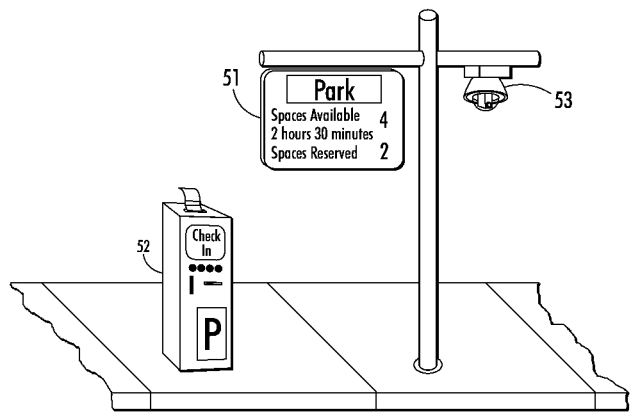
FIG. 3 is a diagram showing, by way of example, a multi-parking space configuration of the system of FIG. 1 in accordance with one embodiment.

Multiple parking spaces 13a-c, typically the set of parking spaces 13a-c that make up a parking pool 12, can be collectively managed through a multiple parking space ("multi-space") meter. FIG. 3 is a diagram showing, by way of example, a multi-parking space configuration 50 of the system 10 of FIG. 1 in accordance with one embodiment. The configuration 50 deploys a multi-space parking meter 52, dynamic signage 51 for indicating parking availability, and a sensor 53 for detecting vehicle occupancy. Other components are possible.

The dynamic signage 51 displays information that guides drivers in deciding whether to park. Providing too much information can be confusing and, in for most cases, is unnecessary. Instead, the parking services 33 dynamically computes how many of the unoccupied parking spaces 13a-c are reserved, how many parking spaces 13a-c are available in the group of meters, how much time is available for parking in one of the parking spaces 13a-c in the parking pool 12 before parking in the parking pool 12 becomes unavailable, and whether any of the parked vehicles 11 is parked illegally. The parking services 33 determines whether parking is available and the maximum amount of time available for parking, as further described below respectively with reference to FIGS. 8 and 9. The available parking and maximum parking time available are then indicated by the dynamic signage 51.

In one embodiment, the dynamic signage 51 shows the number of parking spaces 13a-c available. In a further embodiment, a simpler sign just indicates whether parking is available. In a still further embodiment, the signage can be color-coded, for instance, including red versus green indicators, signs that switch between "Parking Available" to "No Parking Available" or "Full Reserved" indicators or similar variations. Optionally, the sign may also indicate whether any of the cars are parked illegally using, for example, a red indicator, and may also indicate by position or message which of the vehicles 11 is parked illegally.

Single-Space Parking Meter Configuration

Figure 4:
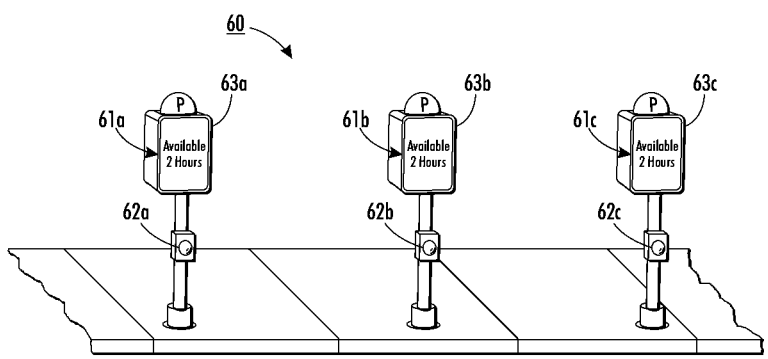
FIG. 4 is a diagram showing, by way of example, a single-parking space parking meter configuration of the system of FIG. 1 in accordance with a further embodiment.

The parking spaces 13a-c in a parking pool 12 can be individually managed through single parking space ("single-space") meters. FIG. 4 is a diagram showing, by way of example, a single-parking space parking meter configuration 60 of the system 10 of FIG. 1 in accordance with a further embodiment. The configuration 60 deploys a plurality of single-space parking meters 63a-c, each of which respectively include dynamic signage 61a-c for indicating parking availability and a sensor 62a-c for detecting vehicle occupancy. Other components are possible.

In this configuration, the parking services 33 treats the parking spaces 13a-c as interchangeable. All of the single-space parking meters 63a-c at unoccupied parking spaces 13a-c show the same amount of available time. The occupancy sensors 62a-c monitor the parking spaces 13a-c to which each of the single-space parking meters 63a-c are assigned through, for instance, magnetic puck sensors in the street or camera-based sensors. In addition, each single-space parking meter 63a-c has its own power supply, such as batteries, power connections, or solar. Each single-space parking meter 63a-c has wireless communications capabilities for interfacing with the parking servers 32.

Short Tether Parking Configuration

Figure 5:
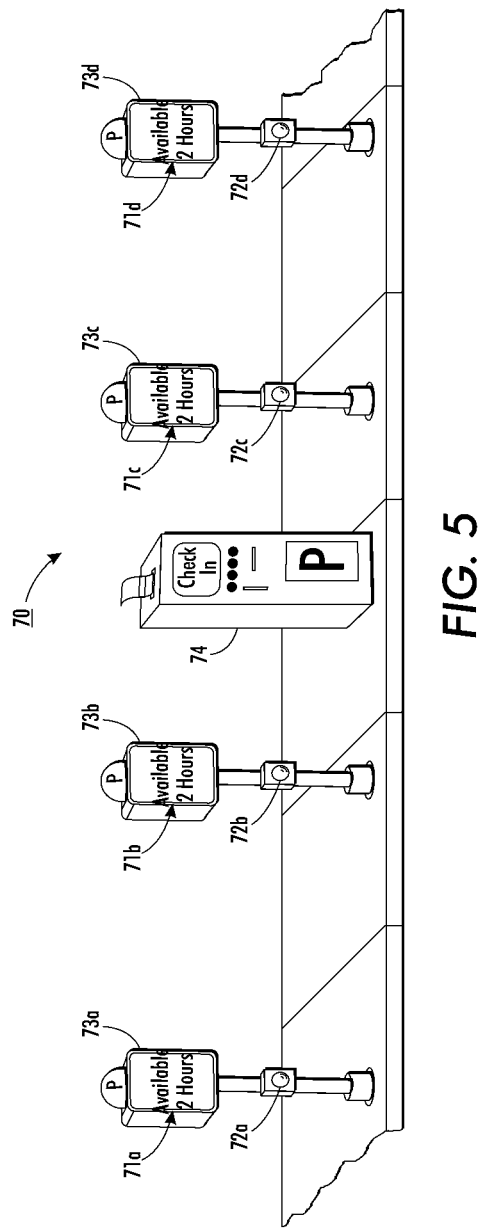
FIG. 5 is a diagram showing, by way of example, a short tethered meter configuration of the system of FIG. 1 in accordance with a further embodiment.

Managers of some installations may prefer that only a few parking spaces be reservable. The parking spaces 13a-c in a parking pool 12 can also be collectively managed through a combination of single parking space appliances, which are tethered to a single multi-space parking meter. Tethered parking appliances offer a clear and direct alternative to overhead signs to mark which parking spaces 13a-c are presently reservable. FIG. 5 is a diagram showing, by way of example, a short tethered meter configuration 70 of the system 10 of FIG. 1 in accordance with a further embodiment. The configuration 60 deploys a multi-space parking meter 74 to which is tethered a plurality of parking appliances 73a-d, each of which respectively include dynamic signage 71a-d for indicating parking availability and a sensor 72a-d for detecting vehicle occupancy. Other components are possible.

In this configuration, power and communications with the parking servers 32 can be provided for all of the parking appliances 73a-d by short wiring, possibly buried, to the multi-space parking meter 74 to simplify the hardware required for each parking space 13a-c. The adjacent parking appliances 73a-d are single-space parking meters, such as described supra with reference to FIG. 4, with their own signage 71a-d for indicating parking availability and occupancy sensors 73a-d to monitor their corresponding parking spaces. In a further embodiment, the parking appliances 73a-d may only provide vehicle occupancy sensors and near-field or other simple provisions for driver check-in. The parking appliances 73a-d are controlled by the parking servers 32 and are interchangeable for parking and reservations. The parking appliances 73a-d for all of the unoccupied parking spaces display the same amount of available time for parking.

Configurations for Mixed Use Parking

Figure 6:
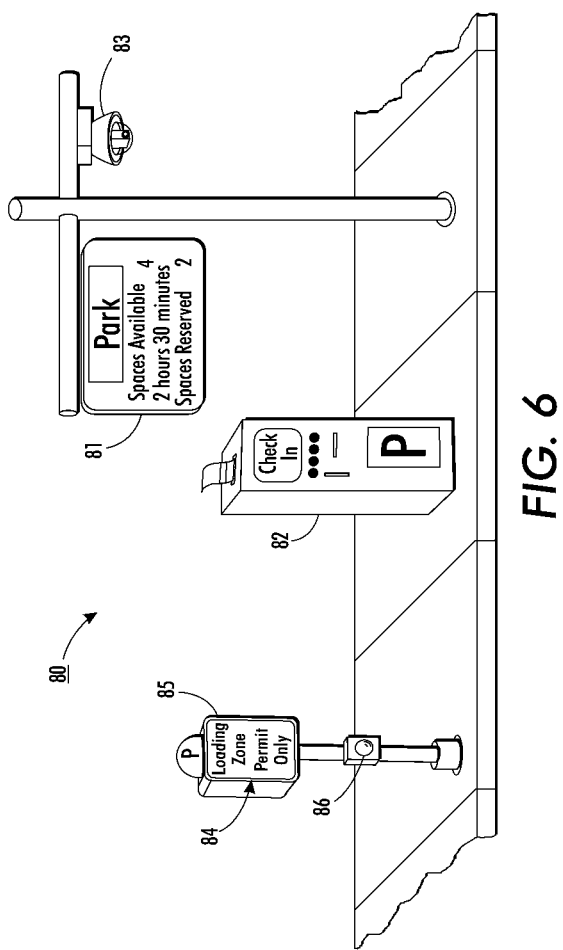
FIG. 6 is a diagram showing, by way of example, a mixed use configuration of the system of FIG. 1 in accordance with a further embodiment.

Some neighborhoods need to support mixed uses of parking spaces 13a-c, that is, situations where the permitted uses vary according to the time and day. For example, double-parked delivery trucks are unfortunately a common sight in many commercial districts and a cause of frustration and congestion. Delivery vehicles would be less likely to double park if they could find adequate parking for making deliveries through improved loading zone management. FIG. 6 is a diagram showing, by way of example, a mixed use configuration 80 of the system 10 of FIG. 1 in accordance with a further embodiment. The configuration 60 deploys a combination of a multi-space parking meter 82 and a single-space parking meter 85. Both the multi-space parking meter 82 and a single-space parking meter 85 respectively include dynamic signage 81, 84 for indicating parking availability and sensors 83, 86 for detecting vehicle occupancy. The multi-space parking meter 82 is used to manage a parking pool 12 that includes a plurality of interchangeable parking spaces 13a-c. The single-space parking meter 85 is used to manage one of the parking spaces 13a-c during set days and times during which that parking space does not participate as part of the parking pool 12 and is instead used as an individually reservable or usable parking space. Outside of the set days and times, the single-space parking meter 85 either mirrors the group parking operations and parking indicators of the multi-space parking meter 82, or is inactive. Other components are possible.

Commercial districts frequently provide mixed uses of parking spaces 13a-c. Some cities regulate loading zones by limiting the hours during which deliveries can be made, while other cities allocate a few parking spaces 13a-c as loading zones, sometimes using marked curbs and signs to designate their special status. When the regulations for using a parking space 13a-c become too complex, with restrictions about particular days and holidays and specific hours in addition to requirements for permits and other limitations, drivers may fail to understand the rules that apply in the moment. Furthermore, fixed parking signs do not provide flexibility to change usage rules dynamically according to varying demand during a day. An example parking scenario can help illustrate.

Loading Zone Mixed Use Parking Scenario.

A commercial district in Mountain City has several blocks that cater to tourists, as well as providing high-end retail and restaurants for city residents. The parking authorities have decided to encourage businesses to complete most deliveries during early morning hours. In the past, the parking authorities allocated one parking space on every block for use a loading zones. This approach suffered several problems. First, delivery trucks often arrived in bunches, so that there were not enough loading zones when they were needed. Also, during the day, the loading zones were limited to a maximum of 20 minutes of parking, making those parking spaces of little use to tourists and other motorists.

Mountain City decided to offer parking reservations using an interchangeable parking space approach, which included providing steps for managing loading zones. Demand modeling suggested that having two or three loading zones available on each block would cover most situations. The parking authorities decided to have single-space parking meters at each of the loading zones to enable delivery vehicles to check-in quickly, such as by using near-field devices, and to have extended loading times, depending upon the type of permit used by the loading zone driver. During the busy parts of the day, the parking servers 32 switched the parking spaces assigned to the loading zones back to general parking by adding them to the group of meters on the city block face. On a few blocks, the local merchants still needed parking for a limited amount of pick up and delivery, even during the busy hours. For these blocks, the city designed specialized rules for parking. Single-space parking meters were used for a parking space in the middle of the city block. If the parking space was unoccupied and not reserved, members of the general public could park for up to five minutes to load or unload. In addition, delivery companies could purchase "delivery permits," which enabled them to reserve the delivery parking spaces for up to 30 minutes, with an escalating rate during the busy times of the day. In addition, two more parking spaces on the block were held back from reservations, except for people with delivery permits. Thus, those delivery companies that could plan their parking needs ahead of time also enjoyed improved access to parking on the street. Moreover, the public benefited from improved traffic flow due to the reduced amount of double parking that had plagued the area in the past.

Other kinds of mixed use parking are possible. For instance, some parking spaces may be made unavailable for parking and used as a traffic lane during commute periods. Parking spaces may be shifted to short term parking for valet or other services during some periods. Some parking spaces may be reserved for special merchant promotions during certain periods.

The methods of determining the number of parking spaces available for reservations or open parking and reserving parking spaces are modified in mixed use parking, such as described in commonly-assigned U.S. patent application, entitled, "Computer-Implemented System And Method For Providing Just-In-Time Loading Zone Parking," Ser. No. 13/624,873, filed Sep. 21, 2012, pending, the disclosure of which is incorporated by reference. By way of overview, parking spaces may be dedicated to a permitted loading zone or other special use during particular hours on particular days. The dedicated use may also happen in response to demand, such as a priority reservation for a loading zone by a permitted delivery company. When a parking space is dedicated to a different use, the parking space needs to be removed for the duration of the mixed use interval from the parking pool of interchangeable spaces managed by the parking servers 32. The number of parking spaces in a parking pool is no longer constant and is instead handled as a function of time. When a parking space is dedicated to mixed use as, for instance, a loading zone, that parking space must be removed from any parking pool of interchangeable parking spaces. If the single-space parking meter 85 assigned to that parking space reverts back to use for general public parking, the parking space can be added back into a parking pool and the parking servers 32 control the operations and dynamic signage 84 on the single-space parking meter 85 to reflect the group membership. For example, if the parking space is unoccupied and open parking is permitted, then the dynamic signage 84 would show the same amount of time available as the overhead dynamic signage 81 displayed with the multi-space parking meter 82. To accommodate this flexibility, the parking services 33 tracks the number of parking spaces in each parking pool using a database or other set of records. At any point in time, the parking services 33 consults the database or records to determine the number of parking spaces assigned to the parking pool during a particular time interval.

Virtual Overlay Parking Reservations

In a further embodiment, the parking support equipment and hardware that is ordinarily installed on a city block is supplemented or replaced by a virtual overlay parking reservations system. Drivers use communications and location-sensing equipment to receive and interact with information about parking and parking reservations. Drivers can access parking information through a virtual overlay communications device, such as a GPS device 41, a smart phone 42, augmented reality glasses, an audio player, or other similar devices.

The virtual overlay parking reservations system maintains a model of parking spaces, reservations, usage information, parking restrictions, regulations, and other information for each city block. The model includes information about where the parking spaces are located, when street sweeping is scheduled, what cars are already parked, and what reservations are pending. Each driver's device sends its location to the parking servers 32, such as through a mobile cell or other wireless network and the parking servers 32 send back parking information relevant to nearby locations for the overlay device to present to the driver.

Here, essentially no parking support equipment or hardware is required on the city block. Drivers perceive parking information through their virtual overlay devices. However, parking information remains invisible to members of the public, unless they are using a virtual overlay device.

Preferential Ordering Configuration

Parking meter configurations that assign a single parking meter or appliance to each parking space, such as in the single-parking space parking meter configuration 60 and the short tethered meter configuration 70, as respectively described supra with reference to FIGS. 4 and 5, hold the potential of creating a race condition between motorists vying to park in one of the parking spaces 13a-c within the same parking pool 12 at the same time. Ordinarily, all of the single-space parking meters 63a-c or appliances 73a-c will show the same amount of maximum available time for the parking pool 12, yet only the first motorist to actually park will actually obtain the maximum available time. The second motorist may get less parking time due to pending reservations 16 for parking in the parking pool 12 of which the second motorist is unaware. For example, in a parking pool 12 where there are two available parking spaces 13a-c and the available time is four hours followed by 15 minutes, the first motorist would get the full four hours of parking, while the second motorist would only get 15 minutes of parking, despite having parked at effectively the same time.

Figure 7:
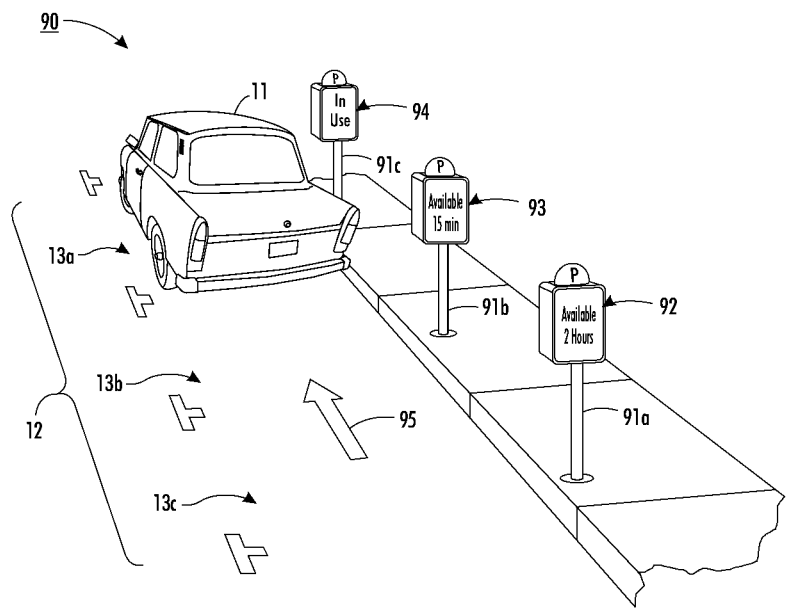
FIG. 7 is a diagram showing, by way of example, a preferential ordering configuration of the system of FIG. 1 in accordance with a further embodiment.

As the state of each parking space 13a-c within a parking pool 12 is centrally managed by the parking services 33, the displayed state of each parking space 13a-c can be assigned to reduce the frequency of situations that could mislead motorists into believing that more parking time is available within a parking pool 12 than is actually allocable. FIG. 7 is a diagram showing, by way of example, a preferential ordering configuration 90 of the system 120 of FIG. 1 in accordance with a further embodiment. A set of single-space parking meters 91a-c are assigned to each parking space 13a-c in a parking pool 12. Each parking meter 91a-c also displays the state 92, 93, 94 of the parking space 13a-c to which the parking meter 91a-c is assigned. The states 92, 93, 94 are preferentially ordered to display parking availability from greatest availability 92 to least availability 93 in the direction of traffic 95, with occupied parking spaces 13a being shown as in use or unavailable 94. In a further embodiment, preferential ordering is only used when less than all of the parking spaces 13a-c in a parking pool 12 have limited availability, as the maximum parking time available would be correct if all of the parking spaces 13a-c were subject to limited availability.

From a driver's perspective, a driver will get the most parking time by taking the first open parking space 13c encountered, assuming that any parking spaces 13a-c are available at all. This approach helps limit traffic congestion by encouraging motorists to take the first parking space 13c that they see, instead of cruising while trying to figure out which parking space 13a-c has the most time available. Preferential ordering of partially interchangeable parking spaces preserves most of the benefits of fully interchangeable parking spaces, as described supra, while reducing the frequency of race conditions due to misapprehensions on the part of motorists who incorrectly assume that the maximum parking time available, as displayed on each parking meter or appliance, applies to all of the parking spaces 13a-c in a parking pool 12. Preferential ordering assumes that most motorists will (or should) take the first available parking space 13c, even though most of the parking within the parking pool 12 remains interchangeable. Moreover, on average, preferential ordering ensures greater parking availability than conventional use of non-interchangeable parking spaces.

Multiple Choice Configuration

Preferential ordering is most effective in parking meter configurations that assign a single parking meter or appliance to each parking space, when compared to parking configurations that rely on dynamic signage 51, such as the multi-parking space configuration 50, as described supra with reference to FIG. 3. Dynamic signage 51 helps inform motorists of parking availability within a parking pool 12, yet showing only the maximum availability parking time can be misleading, while showing preferentially ordered parking availability is impracticable due to the physically disparate location of an overhead sign vis-à-vis the individual parking spaces 13a-c within the parking pool 12.

Figure 8:
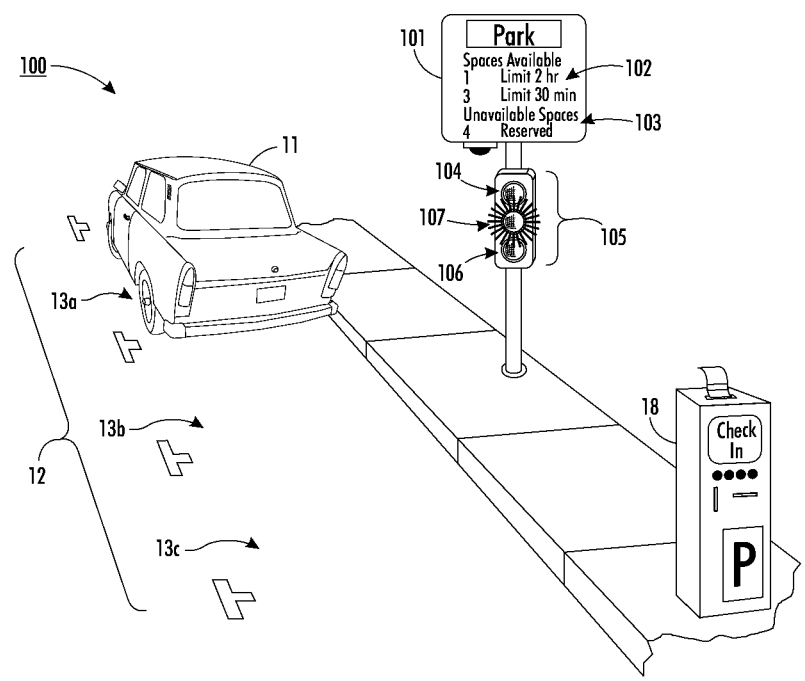
FIG. 8 is a diagram showing, by way of example, multiple choice and unstable state indication configurations of the system of FIG. 1 in accordance with further embodiments.

One solution is to simply better inform motorists by showing more parking data on dynamic signage 51. FIG. 8 is a diagram showing, by way of example, multiple choice and unstable state indication configurations 100 of the system 120 of FIG. 1 in accordance with further embodiments. In one embodiment, multiple choices of parking availability 102 are displayed on dynamic signage 101 accompanying a parking pool 12 of individual parking spaces 13a-c. For instance, the dynamic signage 101 can show the top two amounts of parking time available. The dynamic signage 101 can also show the state of unavailable parking within the parking pool 12. For instance, assume that the dynamic signage 101 shows that only one of the parking spaces within a parking pool 12 can be used for two hours, while the remaining three parking spaces are limited to 30 minutes of parking. Thus, motorists looking for parking will see that there is only one parking space available for two hours and not be misled into believing that all of the parking spaces within a parking pool 12 are available for the full two hours.

Unstable State Indication Configuration

The multiple choice configuration helps to better inform motorists of the overall parking availability within a parking pool 12, but dynamic signage 101 becomes cluttered by the additional multi-choice data and may be difficult to read and understand quickly, especially by a harried (or out-of-town) drivers. Motorists do not necessarily need to know the precise amount of time available to park that is secondary to the maximum available parking time. Rather, they could benefit by merely knowing that the maximum available parking time is about to change, that is, that parking availability is unstable and about to change.

In a further embodiment, the parking services 33 implements an "unstable state" detector for each parking pool 12. An unstable state can occur, for instance, whenever a car parks in a parking space 13a within a parking pool 12, which can affect the amount of time available for parking in the remaining parking space 13b-c, or whenever the maximum parking time available is significantly more than the next best option, say, 15 minutes or 10% more than the next available time period, whichever is less).

The unstable state is then indicated to motorists using an unstable state indicator 104, which can be provided in a form factor analogous to a traffic signal, where a set of lights 105 indicate parking available ("Green"), limited parking ("Yellow"), and no parking ("Red"). Here, a Green light 106 indicates a stable condition. A Yellow light 107 signals a transition from the Green light to the Red light and serves as a warning that parking within the parking pool 12 is unstable. Alternatively, a flashing light, either provided as a single beacon or within a traffic signal arrangement, can indicate the unstable condition.

In a still further embodiment, the dynamic signage 101 is combined with an unstable state indicator 104. The overhead sign shows, for instance, the top two available parking times and the number of parking spaces 13b-c available. In addition, unstable state indicators are provided as part of the overhead sign, such as by providing unstable state indicators next to the multiple choices of parking availability 102 displays, which blink or provide some type of instability indication when a motorist parks in the parking pool 12 or other destabilizing condition occurs. Still other forms of race condition resolution are possible.

In a still further embodiment, the parking services 33 could place a limit on the total number of reservations that one driver can make in a given period of time to prevent abuse of the reservations system and preclude illicit financial gain by booking more time than needed, with exceptions to the limit granted to delivery drivers or other motorists who have a bona fide need to park frequently. This limit can be enforced using the driver's name, credit card, vehicle identifying information, such as license plate, or other identifying information. Still other abuse prevention mechanisms are possible.

Parking Services Methodology

Figure 9:
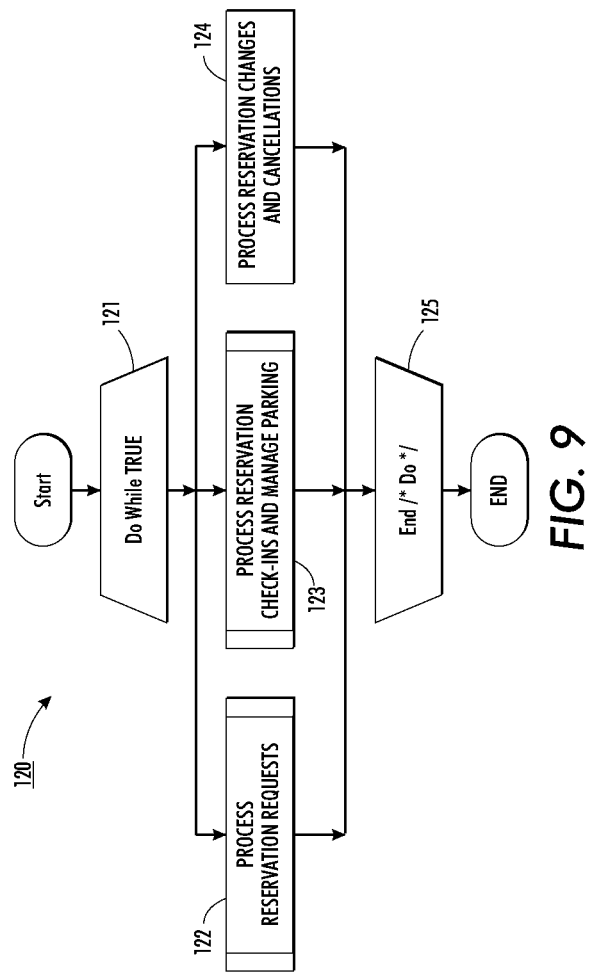
FIG. 9 is a flow diagram showing a computer-implemented method for managing interchangeable parking spaces in accordance with one embodiment.

Parking management revolves around the scheduling and granting of parking reservations and open utilization of unoccupied parking spaces by motorists on the street and other stakeholders. FIG. 9 is a flow diagram showing a computer-implemented method 120 for managing interchangeable parking spaces 13a-c in accordance with one embodiment. The method 120 is performed as a series of process steps by the parking servers 32 (shown in FIG. 2) or other computing device in collaboration with user devices, plus deployed dynamic signage and vehicle occupancy sensors.

Parking is managed by handling three concurrent sets of processes (steps 121-125) as follows. In one set of processes, parking reservation requests are received and booked (step 122), as further described below with reference to FIG. 10. Other types of parking reservation requests may also be concurrently processed. In a second set of processes, parking reservation check-ins and confirmations are handled (step 123), as further described below with reference to FIG. 14. Finally, in a third set of processes, changes to booked parking reservations are processed (step 124). Scheduling changes to booked parking reservations are only permitted under the same criteria applied when originally granted. Specifically, a parking reservation may be changed if the parking spaces 13b-c at the new start time are physically available based on both any unfulfilled pending parking reservations, that is, parking reservations that have not yet started, and any parking spaces in the desired parking pool that are currently occupied by another vehicle, as well as being permitted by any applicable parking regulations and prohibitions and local restrictions. Scheduling changes can include requesting additional or less parking time, rescheduling or postponing a booked parking reservation, and canceling a booked reservation. In addition, the requestors of any waitlisted parking reservation requests that have not yet been fulfilled or extended are notified if a change or cancelation of a booked reservation makes granting of the waitlisted parking reservation request possible, assuming that the requestor has not preauthorized acceptance and payment. Other types of changes to booked parking reservations are possible. Other sets of concurrent processes are possible. The first two sets of processes will now be discussed in detail.

Processing Dual Use Reservations

Figure 10:
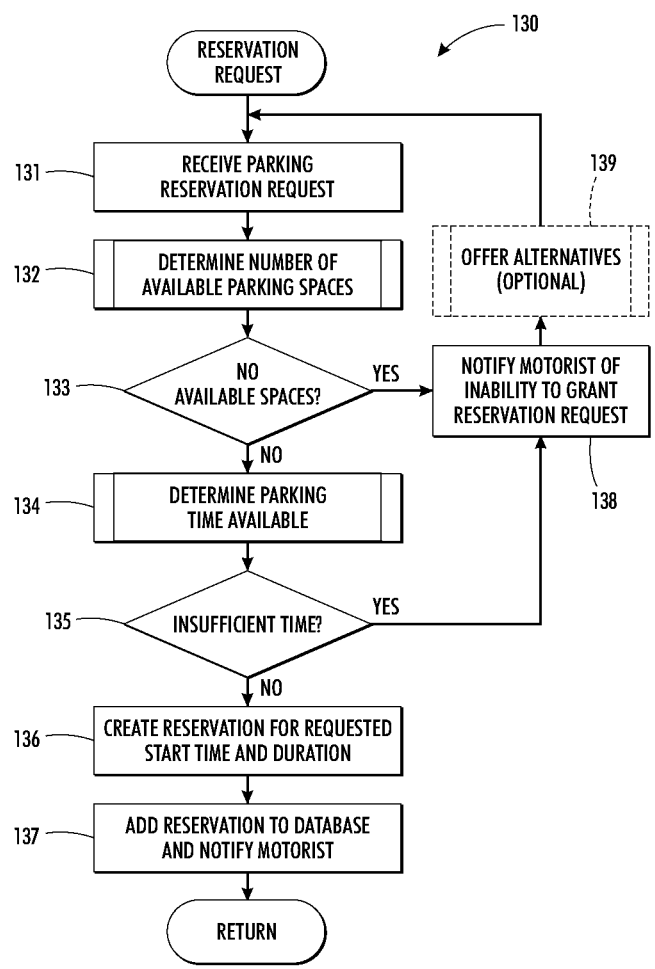
FIG. 10 is a flow diagram showing a routine for processing reservation requests for use in the method of FIG. 9.

Reservation requests for parking are received and booked. FIG. 10 is a flow diagram showing a routine 130 for processing reservation requests for use in the 130 method of FIG. 3. The method is carried out as a single transaction on unchanging data. Motorists can avoid the inefficiencies of individually-metered or -reserved parking allocation and control by reserving parking ahead of time. Two example parking scenarios can help illustrate.

First Parking Scenario: Alice Reserves Parking.

Alice notices that she has a doctor's appointment in midtown on Tuesday at 10:00 AM, where parking is always difficult on weekdays. She wants a parking space near her physician on 18$^{th}$ Avenue and Broadway. Alice anticipates staying for lunch and perhaps doing some shopping.

Alice uses a reserved parking smart phone app to make a parking reservation. She indicates that she needs a reservation on Tuesday at 10:00 AM for two hours. She enters the address of her doctor's office. The app reports back that no parking reservations are available on that city block at 10:00 AM on Tuesday, but offers alternative parking choices of two other city block faces. A parking pool of parking spaces two blocks away from her doctor's office are available for a $2.00 reservation fee and $2.00 per hour for parking. These parking spaces have a two-hour maximum parking limit, so she would have no option to stay longer. Another parking pool of parking spaces, a bit farther away from her doctor's office, near Baker Street and 17$^{th}$ Avenue is only $1.00 per hour for parking. These parking spaces have a four-hour maximum parking limit, so Alice could extend her time if needed. Alice reserves parking space on Baker Street and 17$^{th}$ Avenue for three hours.

On Tuesday morning, Alice heads to her doctor's appointment. Her GPS unit directs her to Baker Street and 17$^{th}$ Avenue. Dynamic overhead signage on the city block face indicates that there are two pending parking reservations and that three parking spaces are available now for two hours. Alice pulls into one of the unoccupied parking spaces. Using her smart phone, she checks into her reservation on the parking servers. Her smart phone confirms her arrival and the overhead signage changes to show that there is now only one pending parking reservation.

First Parking Scenario: Bob Parks.

Shortly after Alice parks her vehicle, Bob also arrives at Baker Street and 17$^{th}$ Avenue. The overhead signage shows one pending parking reservation and three parking spaces available now for up to two hours. Bob does not have a parking reservation. He knows that there is generally a four-hour maximum parking limit on this city block. Bob would like to stay for three hours. However, due to the pending reservations, the overhead signage shows that only two hours of parking are available.

Bob parks. Using his smart phone, he checks in and pays for two hours of parking. He indicates that he would like to stay for three hours, if possible, requests a parking alert from the parking services, and authorizes an automatic payment to extend his parking time for up to three hours if parking becomes available. The overhead signage changes to show that there are two parking spaces available for one hour, due to other pending reservations.

Alice finishes her doctor's appointment early at 11:15 AM. She reconsiders appointments elsewhere in town and decides to leave midtown now. She leaves her parking space and a vehicle occupancy sensor detects that her vehicle has left. The parking services log her departure and checks whether there are any outstanding requests for parking. The parking services notices that Bob has requested more parking time. The parking services reruns the set of parking requests and finds Bob's request can be accommodated. The parking services extend Bob's parking contract to three hours, now ending at 1:00 PM and sends a message to Bob. The parking services directs the overhead signage to reflect the current set of pending reservations and time available.

These parking scenarios illustrate several benefits that would not be possible if each parking space was reserved separately. For example, in making her reservation, Alice did not have to specify a particular parking space, which simplified her interaction with the parking services. Also, when Bob parked, he could tell quickly from the dynamic overhead signage whether there was parking available and how long he could park. He did not have to check each parking meter separately. Finally, when Alice left, additional parking time became available to Bob. If the parking spaces in the parking pool were not interchangeable, more parking time would have become available to Bob only if another motorist canceled a parking reservation for the particular parking space where Bob had parked.

Referring back to FIG. 10, the method is carried out as a single transaction on unchanging data. The parking services 33 first receives a request from a motorist for a parking reservation (step 131), which includes the location of a parking pool 13 and a requested start time and duration or, alternatively, a start time and an end time. The number of available parking spaces 13$b$-$c$ in the parking pool 12 for the requested start time is determined (step 132), as further described infra with reference to FIG. 11. If no parking spaces 13$b$-$c$ are available (step 133), the reservation request fails and the motorist is notified of the parking service's inability to grant the request (step 138). In a further embodiment, the parking services 33 optionally identifies alternative parking options within the general area of the parking pool 12 (step 139), as further described infra with reference to FIG. 13. If denied a parking reservation, the motorist could request to be added to the waitlist.

Figure 12:
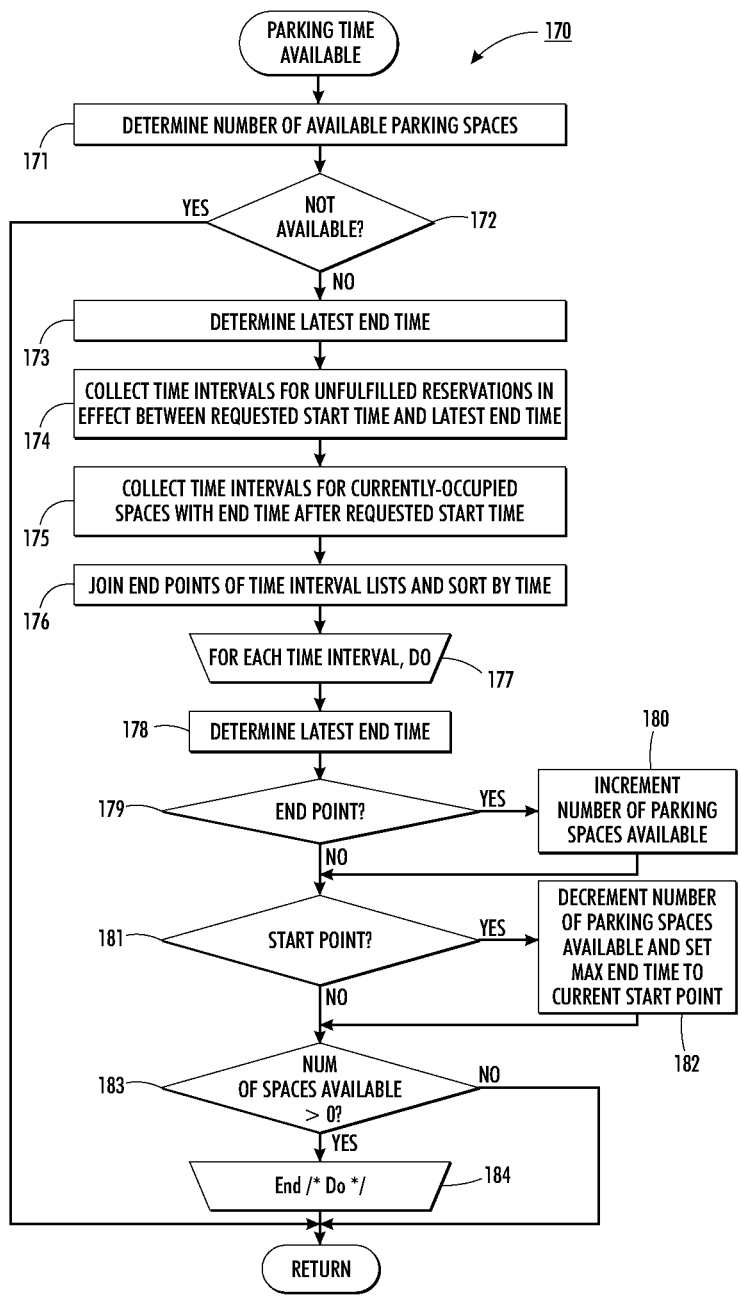
FIG. 12 is a flow diagram showing a routine for determining parking time available for use in the routine of FIG. 10.

If parking spaces 13$b$-$c$ are available (step 133), the time available for parking in the parking pool 12 is determined (step 134), as further described infra with reference to FIG. 12. If an insufficient amount of time is available to satisfy the reservation request (step 135), the reservation request is denied and the motorist is notified of the parking service's inability to grant the request (step 138) and, in a further embodiment, the parking services 33 optionally identifies and offers alternative parking options (step 139), as further described infra with reference to FIG. 13. If denied a parking reservation, the motorist could request to be added to the waitlist. Otherwise, where parking is available for a sufficient amount of time, the parking services 33 creates a reservation record (step 136) for the requested time and duration, which is added to the reservations list 38 (shown in FIG. 2) and the motorist is notified (step 137).

The managing of parking spaces 13$a$-$c$ as a parking pool 12 of interchangeably reservable resources provides several benefits. First, preemption of parking by other motorists is avoided. Once a motorist makes a reservation in a parking pool 12 of equivalent parking spaces 13$a$-$c$, further reservations that would preclude the motorist from parking in the parking pool 12 at the reserved time will not be allocated by the parking services 33. Thus, absent interference from parking scofflaws or other unforeseen circumstances, parking is guaranteed. In addition, once a motorist has accepted a reservation and has parked his vehicle 11 in the parking pool 12, the motorist is not required to move the vehicle 11 for the duration of the reservation. If a motorist wants extend the duration of a parking session, the parking services 33 can offer more parking time if reservation cancellations or early departures from any of the parking spaces 13$a$-$c$ in the parking pool 12 make more parking time available, which the system can process automatically if the motorist preauthorizes a parking time extension and payment of fees. Similarly, if a vehicle occupancy sensor 45 detects that a vehicle 11 has left a parking space 13$a$ before the end of the paid or reserved period, the parking space 13$a$ is made available to other motorists.

Determining Available Parking Spaces

Figure 11:
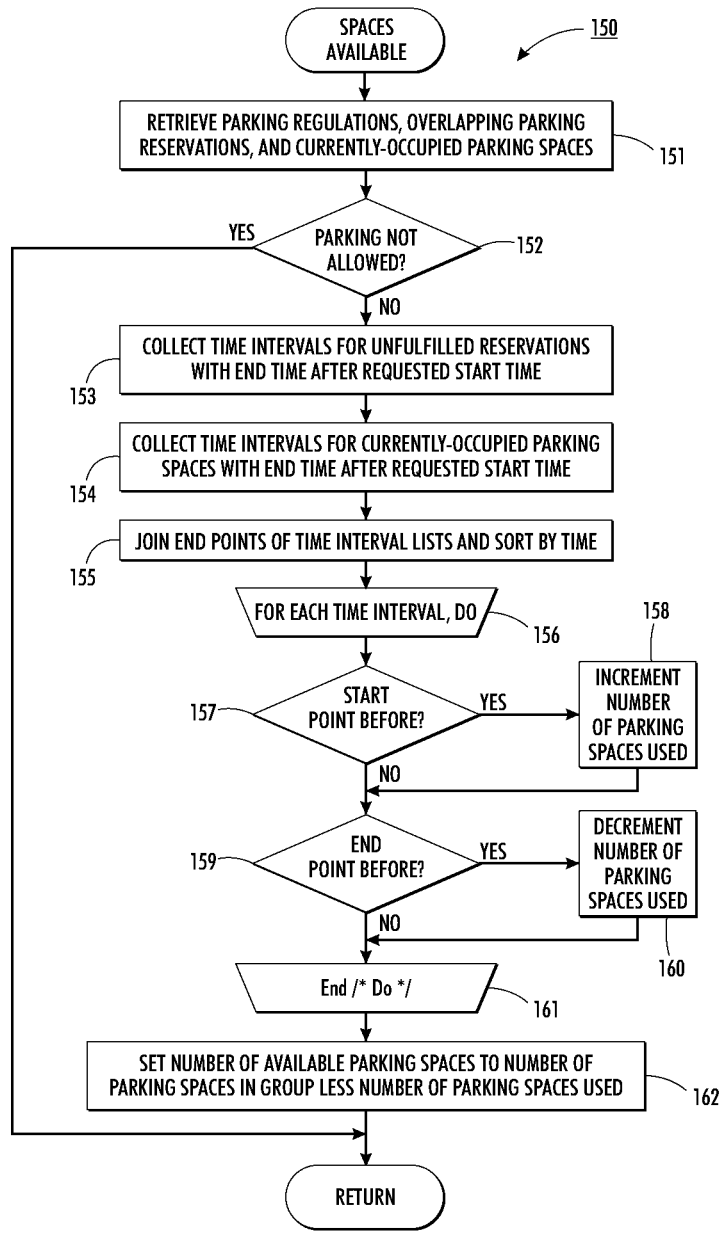
FIG. 11 is a flow diagram showing a routine for determining a number of available parking spaces for use in the routine of FIG. 10.

The number of parking spaces 13$b$-$c$ that are physically available at a particular point in time depends upon both any unfulfilled pending parking reservations and any parking spaces 13$c$ in the desired parking pool 12 that are currently occupied by another vehicle 11, as well as any applicable parking regulations and prohibitions 36 and local restrictions. FIG. 11 is a flow diagram showing a routine 150 for determining a number of available parking spaces for use in the routine 130 of FIG. 10. The routine is carried out as a single transaction on unchanging data. To determine the number of available parking spaces 13$a$-$c$, the parking services 33 first retrieves the parking regulations 36 applicable to the parking spaces 13$a$-$c$ in the desired parking pool 12, the set of parking reservations 38 for the parking pool 12 that overlap the requested reservation in which the reserving motorist's vehicle has not yet arrived, the parking contracts 37 for the currently-occupied parking spaces 13$b$-$c$ in the parking pool 12, and the total number 35 of parking spaces 13$a$-$c$ in the parking pool 12 (step 151). If the requested start time is at a time when parking is not allowed (step 152), no parking is available in the parking pool 12.

Otherwise, the time intervals for all of the unfulfilled parking reservations 38 where the end time of the reservation is after the requested start time are collected (step 153). Similarly, the time intervals for all of the parking contracts 37 for currently-occupied parking spaces 13$a$ where the end time is after the requested start time are collected (step 154). The end points from the two lists of time intervals are joined and sorted in ascending order by time (step 155). The number of parking spaces used is set to zero, and the time points in each time interval in the joined and ordered lists is processed (steps 156-161), as follows. First, if the time point is the start time of the current time interval and the time point occurs before the requested start time (step 157), the number of parking spaces used is incremented (step 158). If the time point is the end time of the current time interval and the time point occurs before the requested start time (step 159), the number of parking spaces used is decremented (step 160). Processing continues with each of the remaining time points (step 161). Thereafter (step 161), the number of available parking spaces 13$b$-$c$ is set to the total number of parking spaces 13$a$-$c$ in the parking pool 12 less the number of parking spaces used (step 162).

In further embodiments, the number of available parking spaces is determined based upon optimistic or pessimistic parking resource utilization forecasts. For example, optimistic forecasts include predicting that some vehicles 11 will leave before the end of their reserved parking period and make currently-occupied parking spaces 13$a$ potentially free prior to the start time of a requested parking reservation. Optimistic forecasts also include predicting that some motorists will not show up for their parking reservations and potentially leave their parking reservations unused. On the other hand, pessimistic forecasts include predicting that some that motorists will disregard parking regulations and existing reservations and potentially park in the parking spaces 13$a$-$c$ in a parking pool 12 without authorization, that is, without paying or first reserving parking. Other optimistic or pessimistic parking resource utilization forecasts are possible.

In still further embodiments, the duration of vehicle occupancy of currently-occupied parking spaces 13a can be adjusted based upon payment status. Specifically, if a parking space 13a is occupied, the parking space 13a can be considered unavailable for some amount of time, depending upon the circumstances. For example, if the use of the parking space 13a is paid, the parking space 13a could be held from parking reservations until the paid time expires. However, if the parking space 13a is unpaid, but the vehicle 11 recently arrived, for instance, within the last couple of minutes, the parking space 13a could be locked temporarily from parking reservations for the maximum amount of time that may be purchased. This time buffer would provide motorists with time to complete check-in without having their expected parking time pre-empted by an intervening parking reservation request. Finally, if the parking space 13a is unpaid and in violation, the parking space 13a should be considered locked for some configurable amount of time under a reasonable probability that the vehicle 11 would be moved or towed. Other adjustments to vehicle occupancy duration are possible.

In a yet further embodiment, parking reservations for an indefinite duration are handled in one of two possible ways. First, open-ended parking reservations, that is, a request for parking with a maximum permissible or even undefined ending time, if not otherwise precluded, can be discouraged by disallowing parking reservation requests that extend too far into the future. This option also accommodates the possibility of changing parking policies over extended periods without the risk of upsetting existing, albeit indefinite, parking reservations. Alternatively, open-ended parking reservations can be accommodated by simply decreasing the number of the parking spaces 13a-c in the parking pool 12 until the vehicle 11 departs from one of the parking spaces 13a. Other ways to handle indefinite open-ended parking reservations are possible.

In a still further embodiment, "minimal spacing intervals" are introduced that enable the public to park conveniently and avoid some confrontation, given a certain degree of uncertainty and delay in human activities. The sizes of the various intervals are set as policy parameters by the parking authorities and would typically be in the range of five to fifteen minutes. The intervals include:

Minimal Gap—Pre-Reservation Interval.
This interval is a minimum gap of time before a pending parking reservation during which another motorist is allowed to park. This interval allows for some uncertainty in case a motorist arrives a few minutes early for a reservation.

Minimal Forward Interval.
This interval is a minimum gap of time into the future at which a reservation can be made. The minimum forward interval reduces the importance of a race condition between a motorist pulling into an available parking space 13b-c and an online user making a competing parking reservation. By precluding the making of remote reservations that begin immediately, the parking services 33 favor a motorist pulling into a parking space and requesting parking using a parking meter or appliance.

Minimum Afterwards Interval.
This interval is a gap of time after a parking reservation or the end of a parking contract before which another parking reservation can be made. The minimum afterwards interval anticipates that motorists sometimes return late to a parking space and reduces conflicts that may arise when a motorist is late in returning to move a vehicle 11 at the end of a parking session. In a yet further embodiment, the parking authorities may cite motorists for departing late from their parking space.

Pre-Reservation Grace Period.
This interval is a grace period provided when a motorist arrives early to a previously-reserved parking space. Parking policies may dictate whether an early-arriving motorist must then give up some time at the end of the reservation period.

Late Arrival Grace Period.
This interval is a gap of time during which a motorist can be late in arriving to park before a parking reservation is cancelled by the parking services 33. The treatment of late arrivals to reserved parking spaces can be governed by further parking policies. For example, a motorist may be contacted when the grace period is almost over and given an opportunity to extend. Alternatively, the motorist may purchase a "hold guarantee" that holds the parking reservation for an extended period, such as 15 minutes and the motorist would get a partial refund for cancelling the held parking reservation.

Other minimal spacing intervals are possible.

Determining Available Parking Time

The time available for parking in a parking pool 12 at a particular point in time depends upon both any unfulfilled pending parking reservations and any parking spaces 13a in the desired parking pool 12 that are currently occupied by another vehicle 11. FIG. 12 is a flow diagram showing a routine 170 for determining parking time available for use in the routine 130 of FIG. 10. This routine determines the amount of time available for parking in a parking pool 12 at a requested time. Two example parking scenarios can help illustrate. The first parking scenario represents a simple case, where unfulfilled parking reservations monotonically increase the demand for parking spaces. The second scenario introduces a somewhat more complex case, where a longer available time for parking is possible because of the expected arrival and departure of cars.

First Parking Scenario.
Charlie wants to reserve a parking space in a parking pool managed by two parking meters at 8:00 AM on Wednesday. Suppose, given the applicable parking regulations, current vehicle occupancy, and unfulfilled parking reservations, that two of the parking spaces are expected to be available at that time. Suppose further that there are three upcoming parking reservations for 2.5 hours each in the time period after 8:00 AM on Wednesday, starting at 9:00 AM, 10:00 AM and 11:30 AM. How long of a parking period could be offered to Charlie? The 9:00 AM unfulfilled parking reservation can be satisfied using one of the unoccupied parking spaces. Charlie can park in the other parking space until that parking space is required by another parking reservation at 10:00 AM. If Daryl tries to make a parking reservation after Charlie, he will be offered only one hour of time since that parking space will be needed to satisfy the 9:00 AM reservation.

Second Parking Scenario.
This scenario shows that the process of determining how long Charlie can park is properly iterative and depends upon a detailed accounting of the projected arrivals and departures of other motorists. As before, Charlie wants to reserve a parking space in a parking pool managed by two parking meters at 8:00 AM on Wednesday. Again, suppose, given the applicable parking regulations, current vehicle occupancy, and unfulfilled parking reservations, that two of the parking spaces are expected to be available at that time. There are four unfulfilled reservations spaced out in time, beginning with Alice from 9:00 AM to 9:30 AM, Bob from 10:00 AM to 12:30 PM, Eddie from 11:30 AM to 2:00 PM, and Daryl from 12:30 PM to 2:00 PM. Conservatively, Charlie can park until at least 9:00 AM since there is another unoccupied parking space to satisfy Alice's pending 9:00 AM parking reservation. However, Charlie could actually stay longer. In the previous parking scenario, Charlie had to leave by 10:00 AM to accommodate Bob's 10:00 AM parking reservation. In this parking scenario, since Alice's 9:00 AM parking reservation ends at 9:30 AM, her parking space will become available to satisfy Bob's 10:00 AM reservation, which means that Charlie could be offered the use of a parking space until 11:30 AM.

Referring back to FIG. 12, the routine is carried out as a single transaction on unchanging data. To determine the time available for parking, the parking services 33 first determines the number of available parking spaces 13b-c in the parking pool 12 for the requested start time (step 171), as further described supra with reference to FIG. 11. If no parking spaces 13b-c are available (step 172), the reservation request fails. Otherwise, if parking spaces 13b-c are available (step 172), based upon the applicable parking regulations, the latest end time for parking is determined (step 173) as the requested start time, plus the maximum permitted parking time as of the requested start time.

Next, the time intervals for all of the unfulfilled parking reservations that are in effect between the requested start time and the latest end time are collected (step 174). Similarly, the time intervals for all of the parking contracts for currently-occupied parking spaces 13a where the end time is after the requested start time are collected (step 175). The end points from the two lists of time intervals are joined and sorted in ascending order by time (step 176). The maximum end time is set to zero, and the time points in each time interval in the joined and ordered lists are processed (steps 177-184), as follows. First, the latest end time for parking based on the current time interval is determined (step 178). If the time point is the end time of the current time interval (step 179), the number of available parking spaces 13b-c in the parking pool 12 is incremented (step 180). If the time point is the start time of the current time interval (step 181), the number of available parking spaces 113b-c in the parking pool 12 is decremented and the maximum end time is set to the start time of the current time interval (step 182). If the number of available parking spaces 113b-c in the parking pool 12 is greater than zero (step 183), processing continues with the next time point (step 184). Otherwise, the maximum available time has been found and processing of the time points is complete (step 184).

Identifying Alternative Parking Options

Figure 13:
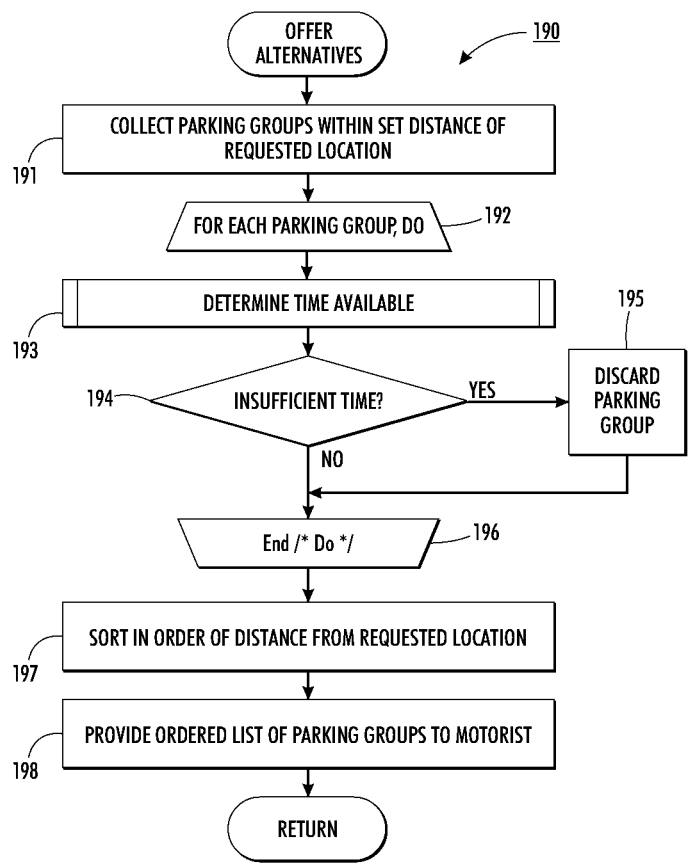
FIG. 13 is a flow diagram showing a routine for offering parking space alternatives for use in the routine of FIG. 10 in accordance with a further embodiment.

Parking may not always be available either where desired or for the amount of time needed. Interchangeably reservable parking spaces enable a wider range of alternative parking options to be offered to a motorist who has been unable to initially secure a parking reservation. FIG. 13 is a flow diagram showing a routine for offering parking space alternatives 190 for use in the routine 130 of FIG. 10 in accordance with a further embodiment. The routine identifies a parking pool 12 within a set distance to a requested location with at least a specified amount of time available at a given time.

The routine is carried out as a single transaction on unchanging data. First, all parking pools 12 within a set distance of the location requested by the user are collected (step 191). The distance of each parking pool 12 to the requested location is stored for each parking pool for easy look up. Each parking pool 12 is processed (steps 192-196), as follows. First, the time available for parking in the current parking pool 12 is determined (step 193), as further described supra with reference to FIG. 12. If an insufficient amount of time is available to satisfy the reservation request (step 196), the current parking pool 12 is discarded (step 195) from further consideration as an alternative parking option. Processing continues with each of the remaining parking pools 12 (step 196).

The remaining parking pools 12 with sufficient amounts of time to satisfy the reservation request are sorted in ascending order of distance to the requested location (step 197) and presented to the user (step 198) together with pricing and other information.

The simplest use case assumes that only one motorist with only one vehicle needs to see whether parking is available in a parking pool 12 of interchangeable parking spaces 13a-c and find out the maximum available time for parking at some time in the future. The motorist finds out this information by sending a parking reservation request to the parking services 13. Contrarily, when a motorist pulls up to a parking pool 12 seeking unreserved parking, that motorist also wants a parking "reservation," albeit upon demand, and needs to know how long he can park in that parking pool 12, provided that at least one of the parking spaces 13a-c in the parking pool 12 is available right now. The parking services 33 provides his answer through the dynamic signage 14 accompanying the parking pool 12.

Occasionally, two drivers, both without parking reservations, will pull up to different parking spaces 13a-c in a parking pool 12 on a same city block at about the same time. (In practice, there will be differences in time when the vehicle occupancy sensors 24 detect the arrival of the two drivers' vehicles 11 and their check-in, so truly simultaneous parking reservations would not ordinarily occur.) Parking reservations for the parking pool 12 are pending, but as-yet unfulfilled. The nearby dynamic signage 14 would show how many parking spaces are available and how much time is available. However, two issues can potentially arise:

First, the set of pending parking reservations can start at different times. For example, there may be two open parking spaces 13b-c with two pending unfulfilled parking reservations. One parking reservation may start in one hour and the other parking reservation in two hours. The dynamic signage 14 would show that there are two available parking spaces 13b-c and a maximum parking time of two hours. If the first motorist requests two hours of parking, the dynamic signage 14 will then show that there is now only one parking space available 13b for only one hour and the second motorist to arrive or check-in will not be offered the two hours of parking that they initially expected.

In another case, multiple parking spaces 13a-c are unoccupied, but only one parking space 13b is available, due to pending unfulfilled parking reservations. Vehicle occupancy sensors 24 will detect the two vehicles pulling into the parking pool 12. Typically, one vehicle 11 will be sensed and recorded as having parked first. The parking services 33 will then update the dynamic signage 14 to say that no parking spaces 13a-c are available. The second motorist will then not be allowed to check-in and may be offered a parking reservation nearby.

Various measures can be taken to address the inherent race conditions in such situations of near-simultaneous vehicle arrival and check-in. Simple signs that indicate whether parking is available and for how long are easier and faster to understand, whilst more nuanced and complex messages about multiple pending reservations are more informative, but less comprehensible.

In a further embodiment, the dynamic signage 14 is implanted using an indicator to suggest to motorists that parking availability can change at any time. For example, a Red-Yellow-Green indicator can be incorporated into the dynamic signage 14 in a manner analogous to a traffic light, where a red beacon means no parking; a yellow beacon means limited parking; and a green beacon means parking is allowed. The parking services 33 could use a yellow indicator to signal cases, where available parking time is short or that there is only one parking space available. Although this approach reminds drivers that parking availability is changeable and perhaps likely to change at any moment, race conditions may still occur in practice.

Reservation Check-Ins and Confirmations

Figure 14:
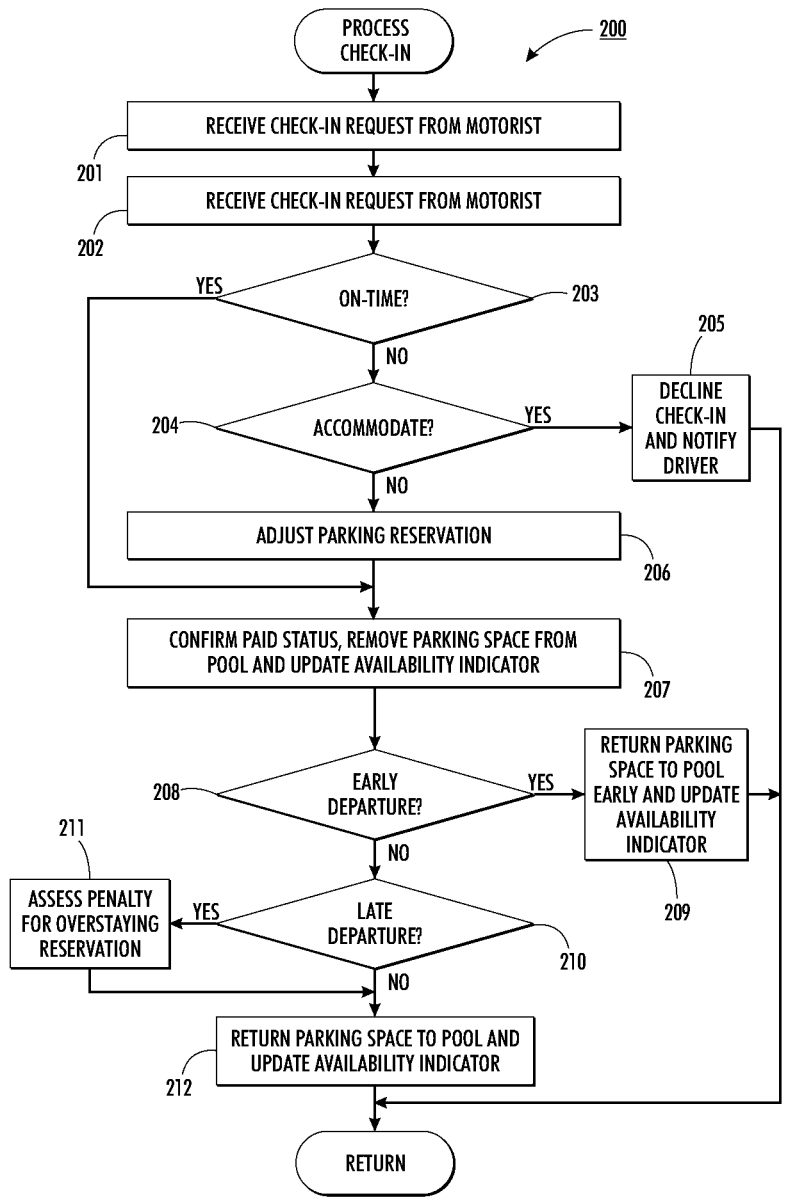
FIG. 14 is a flow diagram showing a routine for processing reservation check-ins for use in the method of FIG. 9.

Parking reservation check-ins and confirmations are handled concurrent to the receipt and booking of parking reservations and the making of parking reservation changes and cancelations. FIG. 14 is a flow diagram showing a routine 200 for processing reservation check-ins for use in the method 120 of FIG. 9. A check-in request is first received from a motorist (step 201) using a device, as described supra. The motorist's parking reservation 39 is retrieved (step 202). If the motorist is on-time (step 203), the reservation and paid status are confirmed, the parking space 13*a-c* is removed from the pool of available parking, and the parking availability indicator is updated to indicate that the parking space is in use (step 207).

Otherwise, if the motorist is either early or late, the parking services 33 evaluates whether parking can be accommodated (step 204) based on inter alia applicable parking regulations 35 and any local restrictions, other pending reservations 35 and, if pooled parking, current occupancy 36. If early or late parking can be accommodated (step 204), the motorist's parking reservation is adjusted (step 206) and reservation confirmation proceeds (step 207). Otherwise, when accommodation is not possible (step 204), check-in is declined and the motorist is notified (step 205).

The motorist parks and, at some point, leaves. If the motorist is departing early (step 208), the parking space 13*a-c* is returned to the pool of available parking, thereby making the parking space 13*a-c* available for use by other motorists early, and the parking availability indicator is updated to indicate that the parking space is available (step 209). If the motorist is departing late (and has not been notified or otherwise dealt with) (step 210), a penalty for overstaying the parking reservation may be assessed (step 211), among other negative dispositions. Finally, whether the motorist is departing on-time or late, the parking space 13*a-c* is returned to the pool of available parking and the parking availability indicator is updated to indicate that the parking space is available (step 212).

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for managing interchangeable parking spaces, comprising:
    forming a parking pool comprising a plurality of parking spaces, which are each interchangeably reservable by motorists;
    identifying the parking spaces in the parking pool that are currently-occupied by other vehicles and reservations by the motorists to park their vehicles in the parking pool;
    determining a number of available parking spaces based on a total number of parking spaces in the parking pool, a number of the currently-occupied parking spaces in the parking pool, and a number of parking spaces that will be used to fulfill the reservations;
    determining maximum available parking durations for each of the parking spaces in the parking pool and selecting one or more of the longest available parking durations as a maximum available time value for the parking pool;
    displaying the number of the available parking spaces in the parking pool and the maximum available time value for the parking pool on dynamic signage;
    identifying a change in a status for the parking pool comprising occupancy of at least one of the parking spaces in the parking pool, inoccupancy of at least one of the parking spaces in the parking pool, receipt of a reservation request for parking in the parking pool, and receipt of a cancellation request for a previously-made reservation for parking in the parking pool; and
    updating the number of the parking spaces in the parking pool and the maximum available time value for the parking pool on the dynamic signage in response to the identified change in the status for the parking pool.

2. A method according to claim 1, further comprising:
    receiving a request from a motorist for on-the-spot parking that comprises a desired duration to park in the parking pool beginning at the current time;
    identifying the parking spaces in the parking pool that are currently-occupied by other vehicles and any reservations by other motorists to park their vehicles in the parking pool concurrent to the current time for the desired duration;
    determining a number of the parking spaces in the parking pool that are available at the current time free of the currently-occupied parking spaces and the parking spaces in the parking pool that will be used to fulfill the reservations;
    determining time available to park in the parking pool through the desired duration free of the currently-occupied parking spaces and the parking spaces in the parking pool that will be used to fulfill the reservations; and
    creating a reservation for the motorist provided that the number of available parking spaces in the parking pool and the time available are sufficient to satisfy the desired duration of the request beginning at the current time.

3. A method according to claim 1, further comprising:
    receiving a request from a motorist for a reservation that comprises a start time from which to park a vehicle for a desired duration in the parking pool;
    identifying the parking spaces in the parking pool that are currently-occupied by other vehicles and any reservations by other motorists to park their vehicles in the parking pool concurrent to the start time for the desired duration;
    determining a number of the parking spaces in the parking pool that are available at the start time free of the currently-occupied parking spaces and the parking spaces in the parking pool that will be used to fulfill the reservations;
    determining time available to park in the parking pool through the desired duration free of the currently-occupied parking spaces and the parking spaces in the parking pool that will be used to fulfill the reservations; and creating a reservation for the motorist provided that the number of available parking spaces in the parking pool and the time available are sufficient to satisfy the start time and the desired duration of the request.

4. A method according to claim 3, further comprising:
identifying parking prohibitions applicable to the parking spaces in the parking pool; and
reducing the number of the parking spaces in the parking pool that are available at the start time by those of the parking spaces subject to the parking prohibitions.

5. A method according to claim 4, further comprising:
determining occupancy durations for one or more of the currently-occupied parking spaces, comprising at least one of:
    setting the occupancy duration for the currently-occupied parking space that has been paid as extending continuously through the time interval for which parking has been paid;
    setting the occupancy duration for the currently-occupied parking space that has not been paid as extending through a temporary period of duration shorter than the time intervals; and
    setting the occupancy duration for the currently-occupied parking space that is not authorized as extending through a tunable period of duration;
adjusting the time intervals in the respective lists by their corresponding occupancy durations.

6. A method according to claim 4, further comprising:
determining occupancy buffers for one or more of the reservations, comprising at least one of:
    setting the occupancy buffer for the reservation as beginning for a period prior to the start time of the reservation;
    setting the occupancy buffer for the reservation as ending for a period extending beyond the desired duration of the reservation;
    setting the occupancy buffer for the reservation as ending for a period extending beyond the time that the vehicle departs from one of the parking spaces in the parking pool;
    setting the occupancy buffer for the reservation as beginning at the time that the vehicle arrives, prior to the start time, in one of the parking spaces in the parking pool; and
    setting the occupancy buffer for the reservation as extending from the start time until the time that the vehicle arrives in one of the parking spaces in the parking pool; and
adjusting the time intervals in the respective lists by their corresponding occupancy buffers.

7. A method according to claim 3, further comprising:
determining a list of time intervals comprising a total length of current occupancy for each of the currently-occupied parking spaces;
determining a list of time intervals comprising a total length of reserved occupancy for each of the parking spaces in the parking pool that will be used to fulfill the reservations;
combining and time-ordering start points and end points from each time interval in the respective lists of the time intervals; and
iteratively increasing the number of the parking spaces in the parking pool for each end point occurring before the start time and decreasing the number of the parking spaces in the parking pool for each start point occurring before the start time.

8. A method according to claim 3, further comprising:
determining a list of time intervals comprising a total length of current occupancy for each of the currently-occupied parking spaces, which extend beyond the desired duration;
determining a list of time intervals comprising a total length of reserved occupancy for each of the parking spaces in the parking pool that will be used to fulfill the reservations in effect between the start time and extending through the maximum parking duration;
combining and time-ordering start points and end points from each time interval in the respective lists of the time intervals; and
iteratively increasing the number of the parking spaces in the parking pool for each end point and decreasing the number of the parking spaces in the parking pool for each start point, which becomes a maximum end time for the reservation requested.

9. A method according to claim 3, further comprising:
optimistically forecasting comprising at least one of:
    predicting a number of the currently-occupied parking spaces becoming potentially free prior to the start time; and
    predicting one or more of the reservations remaining potentially unused; and
increasing the number of the parking spaces in the parking pool that are available at the start time by the number of potentially freed but currently-occupied parking spaces and currently-occupied parking spaces and the potentially unused reservations.

10. A method according to claim 3, further comprising:
pessimistically forecasting comprising:
    predicting a number of the parking spaces in the parking pool being potentially occupied by other vehicles at the start time without authorization; and
decreasing the number of the parking spaces in the parking pool that are available at the start time by the number of potentially unauthorized vehicles.

11. A method according to claim 3, further comprising:
identifying a plurality of alternative parking pools within a given distance of the parking pool;
determining the number of the parking spaces that are available at the start time and the time available to park in each of the alternative parking pools;
selecting each alternative groups where the number of available parking spaces and the time available are sufficient to satisfy the start time and the desired duration of the request; and
providing the selected alternative groups to the motorist as options in lieu of the parking pool of the request.

12. A method according to claim 3, further comprising:
accepting a check-in that executes the reservation by the motorist when the vehicle arrives in one of the parking spaces in the parking pool; and
sensing when the vehicle departs from the parking space, which ends the reservation.

13. A method according to claim 1, further comprising:
accommodating a waitlisted request from a motorist for a reservation that comprises a start time from which to park a vehicle for a desired duration in the parking pool that has been denied if any other motorists' reservations extending over the same start time through the desired duration are canceled or rescheduled clear of the motorist's start time and desired duration.

14. A method according to claim 1, further comprising:
accommodating a waitlisted request from a motorist for a reservation that comprises an additional duration to park in the parking pool beyond the start time and desired duration already granted in the reservation if any other motorists' reservations extending over the same start time through the desired duration and additional duration are canceled or rescheduled clear of the motorist's start time and desired duration and additional duration.

15. A method according to claim 1, further comprising:
accommodating a request from a motorist for a reservation that comprises a start time from which to park a vehicle for an indefinite duration in the parking pool by decreasing the number of the parking spaces in the parking pool until the vehicle departs from one of the parking spaces in the parking pool.

16. A method according to claim 1, further comprising:
displaying availability indicators comprising an indication that no parking is available in the parking pool, an indication that limited parking is available in the parking pool, and an indication that parking is generally available in the parking pool.

17. A method according to claim 1, wherein the number of available parking spaces and the maximum available time value are displayed on the dynamic signage in decreasing order proximate to each of the available parking spaces and in the direction of traffic flow.

18. A method according to claim 1, wherein the dynamic signage is centrally displaying information regarding multiple parking space.

19. A method according to claim 1, wherein the number of available parking spaces and the maximum available time value are subject to change based on an unstable state.

20. A non-transitory computer readable storage medium storing code for executing on a computer system to perform the method according to claim 1.

* * * * *